(12) United States Patent
Sakai

(10) Patent No.: US 12,191,598 B2
(45) Date of Patent: Jan. 7, 2025

(54) CONNECTOR, WIRING HARNESS AND ASSEMBLY METHOD THEREFOR

(71) Applicant: SUMITOMO WIRING SYSTEMS, LTD., Mie (JP)

(72) Inventor: Hiroki Sakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 368 days.

(21) Appl. No.: 17/700,988

(22) Filed: Mar. 22, 2022

(65) Prior Publication Data
US 2022/0320789 A1 Oct. 6, 2022

(30) Foreign Application Priority Data

Mar. 31, 2021 (JP) ................. 2021-059392

(51) Int. Cl.
*H01R 13/52* (2006.01)
*B60R 16/02* (2006.01)
*H01R 13/516* (2006.01)

(52) U.S. Cl.
CPC ..... *H01R 13/5205* (2013.01); *B60R 16/0215* (2013.01); *H01R 13/516* (2013.01); *H01R 2201/26* (2013.01)

(58) Field of Classification Search
CPC ............. H01R 13/5205; H01R 13/516; H01R 2201/26; H01R 13/506; H01R 13/5219; H01R 13/521; H01R 13/502; H01R 13/5202; H01R 31/06; B60R 16/0215; B60R 16/0207
See application file for complete search history.

(56) References Cited

U.S. PATENT DOCUMENTS

| | | | | |
|---|---|---|---|---|
| 5,762,520 | A * | 6/1998 | Martin ................... | H01R 13/56 439/470 |
| 9,455,523 | B1 * | 9/2016 | Sundarakrishnamachari ............. | H01R 13/62905 |
| 10,348,022 | B2 * | 7/2019 | Endo ................... | H01R 13/4361 |
| 11,527,855 | B2 * | 12/2022 | Jung ..................... | H01R 13/44 |
| 2006/0199440 | A1 * | 9/2006 | Holtz ..................... | F02M 37/00 439/736 |
| 2014/0051286 | A1 * | 2/2014 | Itsuki ..................... | H01R 24/20 439/587 |
| 2015/0050826 | A1 * | 2/2015 | Tashiro ................ | H01R 13/502 439/278 |

(Continued)

*Primary Examiner* — Abdullah A Riyami
*Assistant Examiner* — Nelson R. Burgos-Guntin
(74) *Attorney, Agent, or Firm* — Venjuris, P.C.

(57) ABSTRACT

A connector includes a plurality of terminals to be respectively connected to end parts of a plurality of wires, an annular connector housing for accommodating the plurality of terminals, and an inner member to be mounted on an end part of the connector housing. The connector includes a plurality of through holes provided in the inner member, the plurality of wires being individually passed through the plurality of through holes, a plurality of annular sealing members to be individually fit inside the plurality of through holes, and an annular sealing member to be fit outside the inner member. The sealing members are held in close contact with outer peripheral surfaces of the wires and inner peripheral surfaces of the through holes. The sealing member is held in close contact with an outer peripheral surface of the inner member and an inner peripheral surface of the connector housing.

13 Claims, 14 Drawing Sheets

(56) References Cited

U.S. PATENT DOCUMENTS

| | | | |
|---|---|---|---|
| 2016/0284439 A1* | 9/2016 | Suzuki | B60R 16/0222 |
| 2017/0069996 A1* | 3/2017 | Yamada | H01R 13/4367 |
| 2017/0077639 A1* | 3/2017 | Sundarakrishnamachari | H01R 13/4538 |
| 2018/0019544 A1* | 1/2018 | Ishibashi | H02K 11/30 |
| 2018/0062329 A1* | 3/2018 | Davies | H01R 13/73 |
| 2018/0247758 A1* | 8/2018 | Oka | H01R 13/6598 |
| 2018/0358731 A1* | 12/2018 | Endo | H01R 13/4361 |
| 2019/0027871 A1* | 1/2019 | Data | H01R 13/6596 |
| 2019/0044277 A1* | 2/2019 | Mellott | H01R 13/113 |
| 2019/0157799 A1* | 5/2019 | Siwek | H01R 13/5219 |
| 2019/0199040 A1* | 6/2019 | Tanizaki | H01R 13/6683 |
| 2019/0214769 A1* | 7/2019 | Pieknik | H01R 13/6395 |
| 2019/0280433 A1* | 9/2019 | Zhang | H01R 13/42 |
| 2019/0326706 A1* | 10/2019 | Penn | H01R 13/50 |
| 2019/0386424 A1* | 12/2019 | Takagi | H01R 13/58 |
| 2020/0153152 A1 | 5/2020 | Mamiya et al. | |
| 2020/0156568 A1* | 5/2020 | Nagasawa | H01R 13/5812 |
| 2020/0194938 A1* | 6/2020 | Jung | H01R 13/5205 |
| 2020/0259291 A1* | 8/2020 | Lienert | H01R 4/70 |
| 2020/0303864 A1* | 9/2020 | Miyamura | H01R 13/514 |

\* cited by examiner

CONNECTOR, WIRING HARNESS AND ASSEMBLY METHOD THEREFOR

CROSS-REFERENCE TO RELATED APPLICATIONS

This application is based on and claims priority from Japanese Patent Application No. 2021-059392, filed on Mar. 31, 2021, with the Japan Patent Office, the disclosure of which is incorporated herein in their entireties by reference.

TECHNICAL FIELD

The present disclosure relates to a connector, a wiring harness and an assembly method therefor.

BACKGROUND

Conventionally, a wiring harness including a wire and a connector mounted on an end part of the wire is known as a wiring harness to be mounted in a vehicle such as a hybrid or electric vehicle (see, for example, Japanese Unexamined Patent Publication No. 2020-080269). The connector includes a terminal made of metal and connected to the end part of the wire, a connector housing for holding the terminal, a sealing member for sealing between the inner peripheral surface of the connector housing and the outer peripheral surface of the wire and a retainer for retaining the sealing member in the connector housing. A one-piece rubber plug including a plurality of through holes, through which a plurality of wires are individually passed, is used as a sealing member of this type.

SUMMARY

However, if the wires become thicker as larger currents flow in the respective wires, there is a problem that workability in inserting the wires into the through holes of the one-piece rubber plug is deteriorated and the assembling workability of the connector is deteriorated.

The present disclosure aims to improve assembling workability.

This object is solved according to the invention by the features of the independent claims. Particular embodiments of the invention are subject of the dependent claims.

According to one aspect, there is provided a connector, comprising: one or more terminals to be respectively connected to one or more wires; an annular connector housing for at least partly accommodating the terminal(s); an inner member to be mounted on an end part of the connector housing; one or more through holes provided in the inner member, the wire(s) being individually passed through the through hole(s); one or more first annular sealing members to be individually fit inside the through hole(s); and an annular second sealing member to be fit outside the inner member, wherein: the one or more first sealing members are held in close contact with outer peripheral surfaces of the one or more wires and one or more inner peripheral surfaces of the through hole(s), and the second sealing member is held or holdable in close contact with an outer peripheral surface of the inner member and an inner peripheral surface of the connector housing.

According to a particular embodiment, a connector includes a plurality of terminals to be respectively connected to end parts of a plurality of wires, an annular connector housing for accommodating the plurality of terminals, an inner member to be mounted on an end part of the connector housing, a plurality of through holes provided in the inner member, the plurality of wires being individually passed through the plurality of through holes, a plurality of first annular sealing members to be individually fit inside the plurality of through holes, and an annular second sealing member to be fit outside the inner member, wherein the first sealing members are held in close contact with outer peripheral surfaces of the wires and inner peripheral surfaces of the through holes, and the second sealing member is held in close contact with an outer peripheral surface of the inner member and an inner peripheral surface of the connector housing.

According to another aspect, there is provided a wiring harness which includes the above connector and one or more, particularly the plurality of wires to be respectively connected to the one or more (particularly plurality of) terminals.

According to another aspect, there is provided an assembling method for assembling a connector of a wiring harness, in particular according to the above aspect, comprising the following steps: individually fitting one or more first annular sealing members to one or more wires of the wire harness; respectively connecting one or more terminals to the one or more wires; at least partly accommodating the terminal(s) in an annular connector housing; individually passing the one or more wires through one or more through holes provided in an inner member to be mounted on an end part of the connector housing, so that the one or more first annular sealing members are individually fit inside the through hole(s); and fitting an annular second sealing member outside the inner member, so that: the one or more first sealing members are held in close contact with outer peripheral surfaces of the one or more wires and one or more inner peripheral surfaces of the through hole(s), and the second sealing member is held in close contact with an outer peripheral surface of the inner member and an inner peripheral surface of the connector housing.

Particular embodiments of the present disclosure are listed and described as follows.

The connector particularly includes a plurality of terminals to be respectively connected to end parts of a plurality of wires, an annular connector housing for accommodating the plurality of terminals, an inner member to be mounted on an end part of the connector housing, a plurality of through holes provided in the inner member, the plurality of wires being individually passed through the plurality of through holes, a plurality of first annular sealing members to be individually fit inside the plurality of through holes, and an annular second sealing member to be fit outside the inner member, wherein the first sealing members are held in close contact with outer peripheral surfaces of the wires and inner peripheral surfaces of the through holes, and the second sealing member is held in close contact with an outer peripheral surface of the inner member and an inner peripheral surface of the connector housing.

According to this configuration, the inner member to be mounted on the end part of the connector housing is provided with the plurality of through holes, through which the plurality of wires are individually passed. Further, the plurality of first sealing members are individually fit into the plurality of through holes. Thus, the wires and the first sealing members can be mounted in the inner member, for example, by individually mounting the first sealing members one by one on the wires and inserting the wires having the first sealing members mounted thereon into the through holes of the inner member. Accordingly, the first sealing members can be individually mounted one by one on the wires, wherefore workability in mounting the first sealing members on the wires can be improved as compared to the case where the plurality of wires are mounted through a one-piece rubber plug. In this way, the assembling workability of the connector can be improved.

In a conventional connector, if sealing members are merely mounted one by one on wires, sealing cannot be provided between a connector housing and wires since a clearance is formed between adjacent ones of the sealing members in an arrangement direction of the plurality of wires. In contrast, the above configuration is provided with the inner member including the plurality of through holes, the first sealing members to be held in close contact with the inner peripheral surfaces of the through holes and the outer peripheral surfaces of the wires and the second sealing member to be held in close contact with the outer peripheral surface of the inner member and the inner peripheral surface of the connector housing. By these inner member and first and second sealing members, sealing is provided between the outer peripheral surfaces of the wires and the inner peripheral surface of the inner member and sealing is provided between the outer peripheral surface of the inner member and the inner peripheral surface of the connector housing. In this way, it can be suppressed that a liquid such as water intrudes into the connector housing from the end part of the connector housing. By providing the inner member including the plurality of through holes in this way, the assembling workability of the connector can be improved and the waterproofness of the connector can be maintained.

Preferably, the connector further includes a retainer to be mounted on an end part of the connector housing, the retainer retaining the inner member and the first sealing members in the connector housing.

According to this configuration, the detachment of the inner member and the first sealing members from the connector housing can be suppressed by the retainer. In this way, waterproofness in the connector can be suitably maintained.

Preferably, the inner member includes at least one first engaging portion to be engaged with the connector housing, the retainer includes at least one second engaging portion to be engaged with the connector housing, and the first engaging portion is provided at a position different from the second engaging portion in a circumferential direction of the connector housing.

According to this configuration, the first engaging portion of the inner member and the second engaging portion of the retainer are provided at positions mutually different in the circumferential direction of the connector housing. Thus, the first and second engaging portions are provided at positions not overlapping in a radial direction of the connector housing. Therefore, the connector can be reduced in size in the radial direction of the connector housing as compared to the case where the first and second engaging portions overlap in the radial direction of the connector housing.

Preferably, the retainer is composed of or comprises a pair of divided bodies, each of the pair of divided bodies includes at least one third engaging portion, at least one fourth engaging portion and at least one fifth engaging portion provided inside the retainer, the third engaging portion of one of the pair of divided bodies is engaged with the fourth engaging portion of the other of the pair of divided bodies, and the fifth engaging portion of the one divided body is engaged with the fifth engaging portion of the other divided body.

According to this configuration, the retainer is composed of the pair of divided bodies. Thus, the retainer can be mounted on the end part of the connector housing, for example, after the one or more wires at least partly are inserted into the connector housing. In this way, workability in mounting the retainer on the connector housing can be improved and the assembling workability of the connector can be improved. Further, the pair of divided bodies are engaged at plural (e.g. three) positions of the third, fourth and fifth engaging portions. Thus, the pair of divided bodies can be firmly engaged with each other and the separation of the retainer from the connector housing can be suitably suppressed. In this way, the detachment of the retainer from the connector housing can be suitably suppressed. Further, since the fifth engaging portions are provided inside the retainer, the fifth engaging portions are not exposed to the outside of the retainer. Thus, it can be suppressed that a worker erroneously disengages the fifth engaging portions. In this way, it is possible to suppress the separation of the pair of divided bodies and the detachment of the retainer from the connector housing.

Preferably, each of the pair of divided bodies includes a facing surface facing the other divided body, a recess recessed from the facing surface and a resiliently deformable resilient piece substantially projecting toward the other divided body from a bottom surface of the recess, and the fifth engaging portion is provided on a tip part of the resilient piece.

According to this configuration, the resilient piece having the fifth engaging portion provided on the tip part is provided to project toward the other divided body from the bottom sf of the recess provided in the facing surface. Thus, a wider space in which the resilient piece can be deflected can be formed and the enlargement of the retainer can be suppressed, for example, as compared to a configuration not including the recess, i.e. a configuration in which the resilient piece is provided on the facing surface. Here, "facing each other" in this specification indicates that surfaces or members are at positions in front of each other and means not only a case where the both are perfectly at the positions in front of each other, but also a case where the both are at positions partially in front of each other. Further, "facing each other" in this specification means both a case where another member is present between two parts and a case where nothing is present between two parts.

Preferably, the retainer includes one or more, particularly a plurality of wire through holes, the one or more, particularly the plurality of wires being individually passed through the one or more, particularly the plurality of wire through holes, and each of the one or more, particularly the plurality of wire through holes includes a projecting portion projecting radially inwardly of the wire through hole from an inner peripheral surface of the wire through hole.

According to this configuration, the projecting portion projecting radially inwardly of the wire through hole, i.e. toward the wire passed through the wire through hole, is provided on the inner peripheral surface of each wire through hole. Since the wire passed through the wire through hole can be suitably supported by this projecting portion, it can be suitably suppressed that the wire swings inside the wire through hole. In this way, a relative movement of the terminal connected to the end part of the wire with respect to a mating terminal can be, for example, suitably suppressed. As a result, the wear of a contact point between the terminal and the mating terminal can be suitably suppressed.

Preferably, the plurality of wire through holes include a first wire through hole and a second wire through hole, the fifth engaging portions are provided between the first and second wire through holes in an arrangement direction of the first and second wire through holes, the first wire through hole is provided between the third and fifth engaging portions in one divided body in the arrangement direction of the first and second wire through holes, and the second wire through hole is provided between the fourth and fifth engaging portions in the one divided body in the arrangement direction of the first and second wire through holes.

According to this configuration, the first wire through hole is provided between the third and fifth engaging portions of the one divided body, and the second wire through hole is provided between the fourth and fifth engaging portions in the one divided body. That is, the first and second wire through holes are provided to be sandwiched by engaging parts at two positions in the one divided body. Thus, the pair of divided bodies can be firmly engaged in each wire through hole, for example, as compared to the case where an engaging part is provided only at one position near the first and second wire through holes. Since the pair of divided bodies can be suitably brought close to each other in the first and second wire through holes in this way, the wires can be stably supported by the projecting portions provided on the inner peripheral surfaces of the first and second wire through holes. Therefore, it can be suitably suppressed that the wires swing inside the first and second wire through holes.

Preferably, the pair of divided bodies have the same shape. According to this configuration, since the pair of divided bodies have the same shape, the number of components, in particular, an increase in the number of components, can be suppressed.

Preferably, the connector housing includes an inner housing for at least partly accommodating the one or more, particularly the plurality of terminals and an outer housing for at east partly accommodating the inner housing, the inner housing is a component separate from the outer housing, and the inner member is mounted or mountable on an end part of the outer housing and supports the inner housing inside the outer housing.

According to this configuration, the inner housing accommodating the terminals is supported by the inner member inside the outer housing. Thus, if vibration is applied to the connector, it can be suppressed that the inner housing swings inside the outer housing. In this way, relative movements of the terminal(s) accommodated in the inner housing with respect to the mating terminal(s) can be suppressed and the wear of contact points between the terminal(s) and the mating terminal(s) can be suitably suppressed.

Preferably, the inner housing includes a base portion and one or more, particularly a plurality of terminal accommodating portions extending from the base portion, the one or more, particularly the plurality of terminal accommodating portions individually accommodate the one or more, particularly the plurality of terminals, the one or more, particularly the plurality of terminal accommodating portions are integrally or unitarily formed through the base portion, and the inner member supports the inner housing by contacting the base portion.

According to this configuration, the one or more, particularly the plurality of terminal accommodating portions are integrally or unitarily formed through the base portion. Thus, the number of components can be reduced as compared to the case where the plurality of terminal accommodating portions are configured as separate components. Further, the one or more, particularly the plurality of terminal accommodating portions can be supported by the contact of the inner member with the base portion. Thus, the structure of the inner member can be simplified as compared to the case where structures for supporting the plurality of terminal accommodating portions are individually provided.

According to a further aspect, there is provided a wiring harness which includes a connector as described above, and the one or more, particularly the plurality of wires to be respectively connected to the one or more, particularly the plurality of terminals.

According to this configuration, the assembling workability of the wiring harness can be improved and the tightness or waterproofness of the wiring harness can be maintained by providing the inner member including the one or more, particularly the plurality of through holes.

According to the connector and wiring harness of the present disclosure, an effect of improving assembling workability is achieved.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION

Specific examples of a connector and a wiring harness of the present disclosure are described below with reference to the drawings. In each figure, some of components may be shown in an exaggerated or simplified manner for the convenience of description. Further, a dimension ratio of each part may be different in each figure. "Parallel" and "orthogonal" in this specification mean not only strictly parallel and orthogonal, but also substantially parallel and orthogonal within a range in which functions and effects in an embodiment are achieved. Note that the present invention is not limited to these illustrations and is intended to be represented by claims and include all changes in the scope of claims and in the meaning and scope of equivalents.

(Overall Configuration of Wiring Harness 10)

Figure 1:
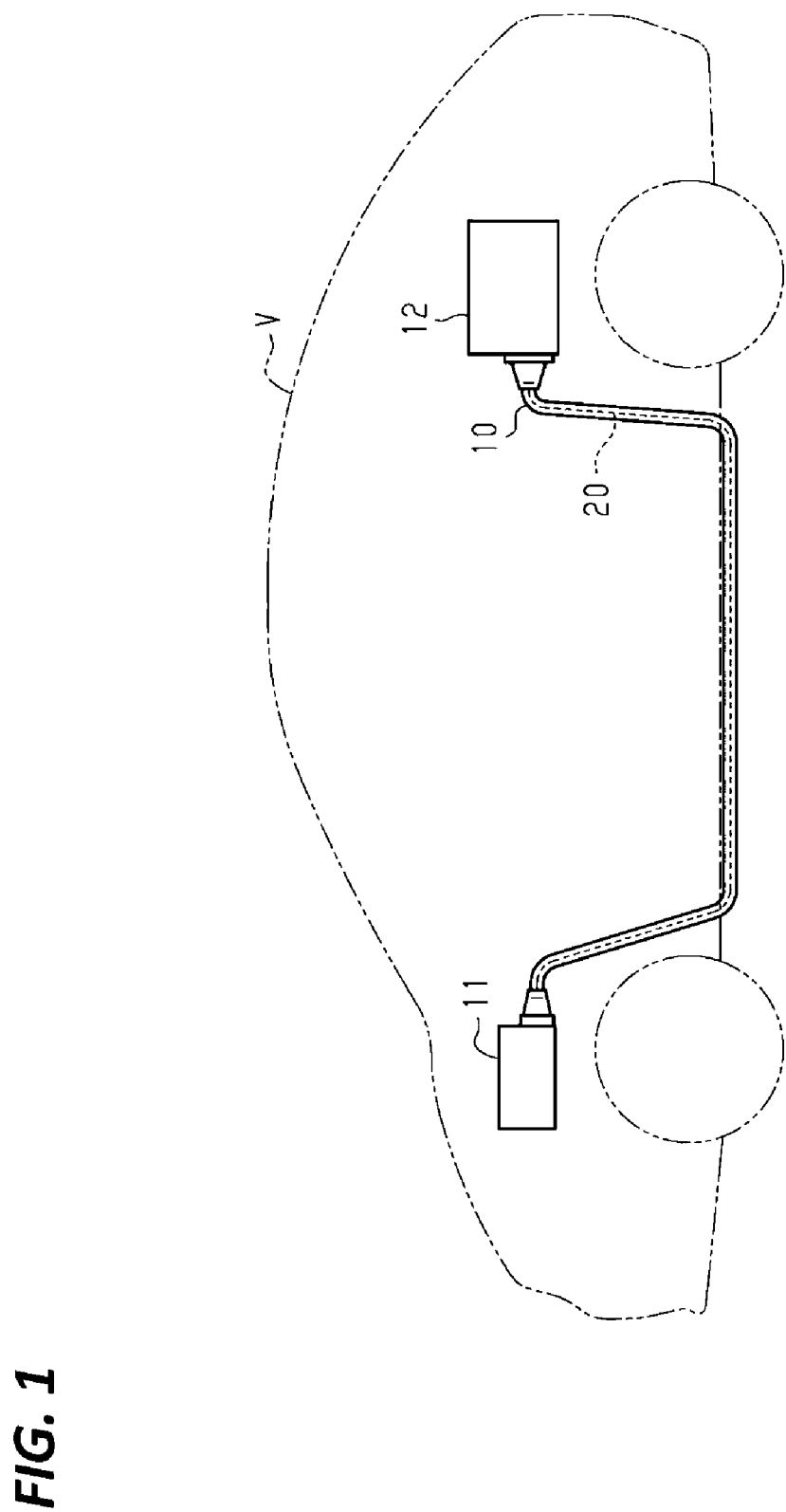
FIG. 1 is a schematic configuration diagram showing a wiring harness of one embodiment.

A wiring harness 10 shown in FIG. 1 electrically connects two or more (two in this embodiment) in-vehicle devices 11, 12. The wiring harness 10 and the in-vehicle devices 11, 12 are or are to be provided in a vehicle V such as an electric or hybrid vehicle. The wiring harness 10 electrically connects, for example, the in-vehicle device 11 installed in a front part of the vehicle V and the in-vehicle device 12 installed rearward of the in-vehicle device 11 in the vehicle V. For example, a high-voltage battery, an inverter, a motor, a relay boxy and the like can be cited as the in-vehicle devices 11, 12.

Figure 2:
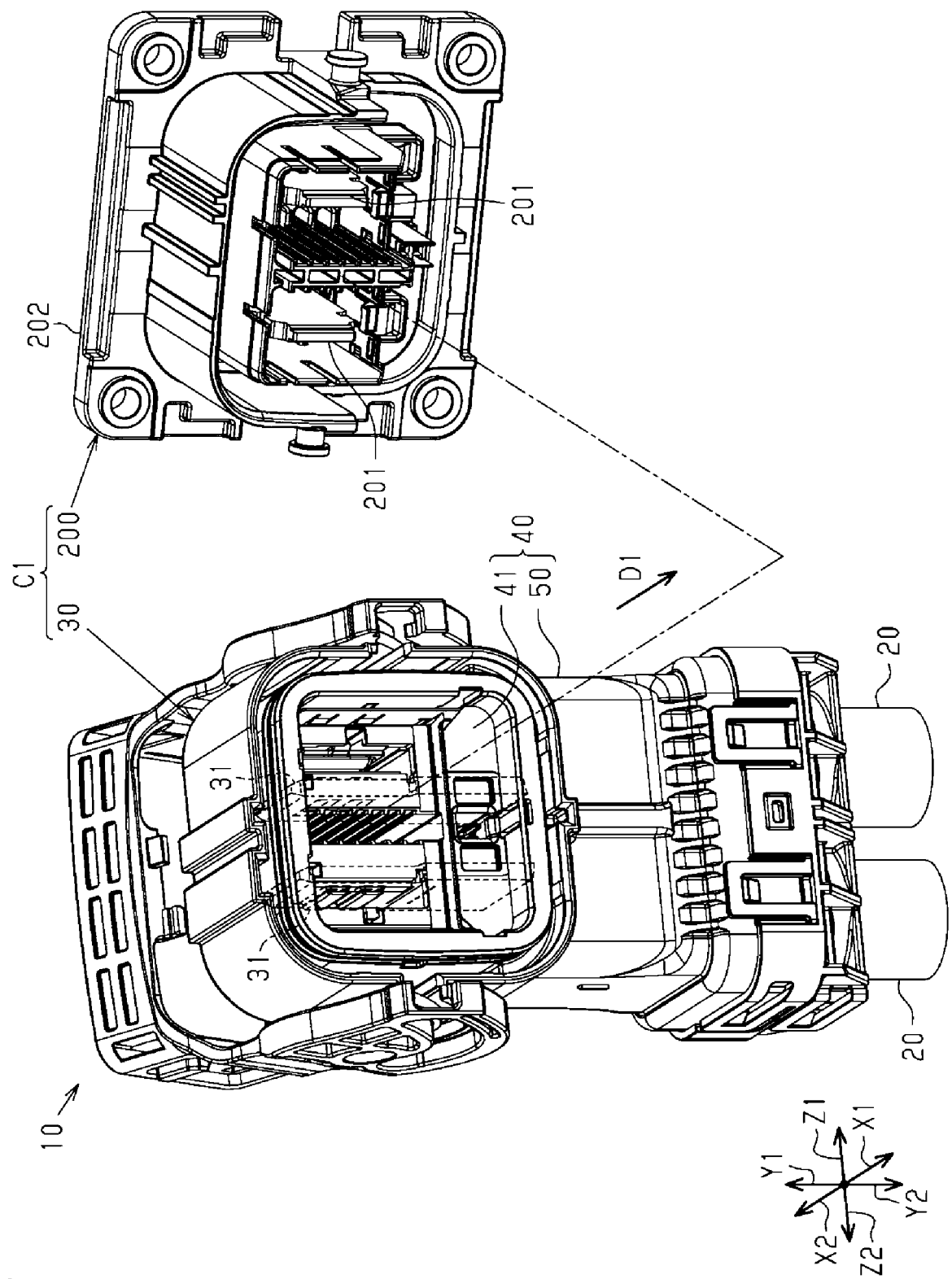
FIG. 2 is a schematic exploded perspective view showing a connector assembly of the embodiment.
Figure 3:
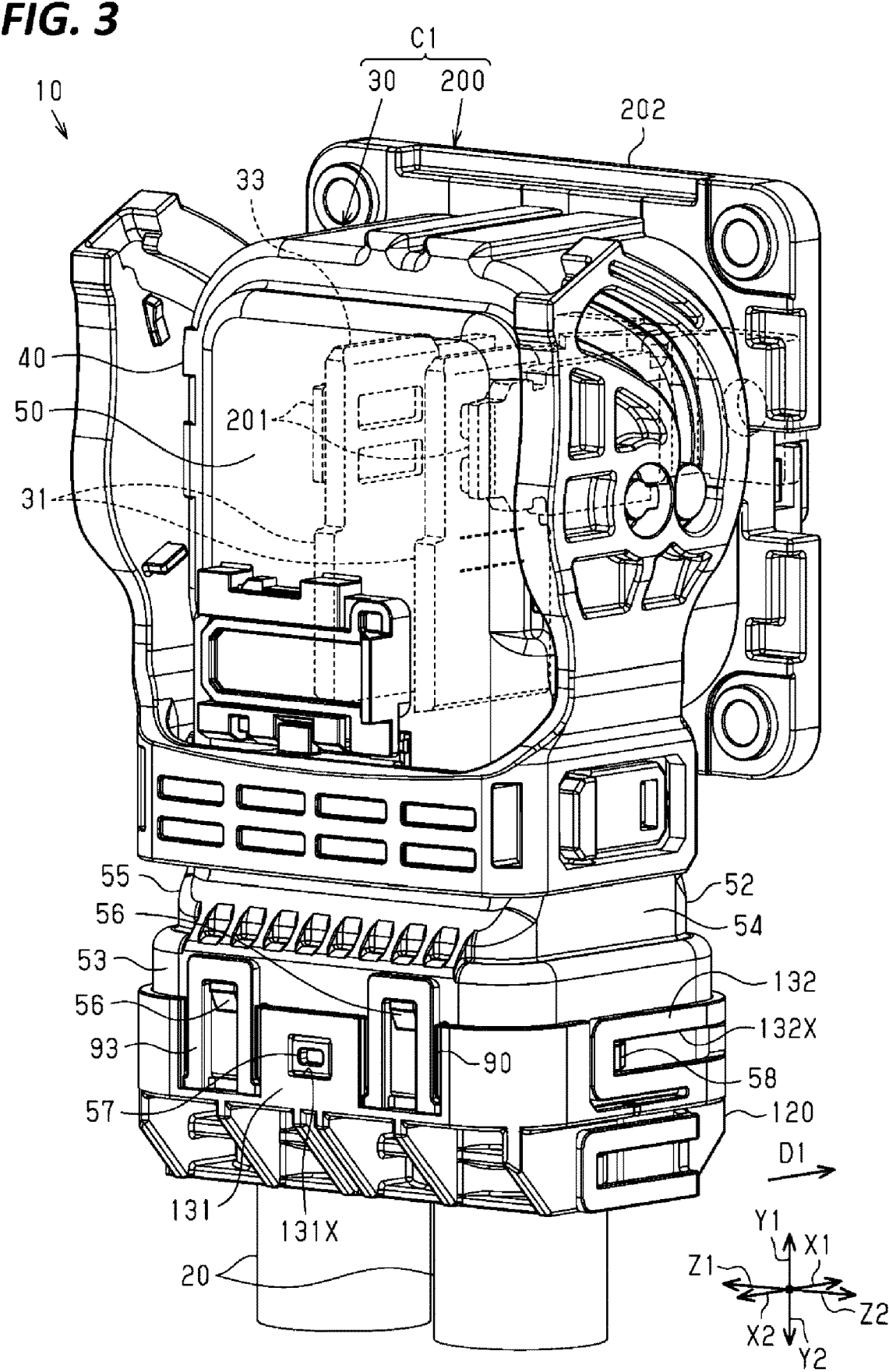
FIG. 3 is a schematic perspective view showing the connector assembly of the embodiment.

As shown in FIGS. 2 and 3, the wiring harness 10 includes, for example, one or more (two in this embodiment) wires 20 and a connector assembly C1 mounted on (particularly end parts of) the wires 20.

(Overall Configuration of Connector Assembly C1)

The connector assembly C1 includes a connector 30 and a connector 200 (as an example of a mating connector) attachable to and detachable from the connector 30. The connector 30 includes a plurality of (two in this embodiment) terminals 31 made of conductive material such as metal. The connector 200 includes a plurality of (two in this embodiment) terminals 201 made of conductive material such as metal and a connector housing 202 for holding the plurality of terminals 201. The connectors 30, 200 are or are to be assembled with each other along an assembling direction D1. The connector 30 is connected to the connector 200, for example, along the assembling direction D1. If the connector 30 is properly connected to the connector 200 as shown in FIG. 3, the terminals 31 and 201 are electrically connected to each other. The connector 200 particularly is fixed or mounted to a mounting target such as a case of the in-vehicle device 11, 12 (see FIG. 1). Note that the assembling direction D1 indicates a relative assembling direction of the connector 30 with the connector 200 and the connector 200 is not limited as a fixed side. Further, a vertical direction in each figure does not necessarily indicate postures of the connectors 30, 200 during use.

In the following description, in describing a positional relationship of each constituent element of the connector 30, a direction coinciding with the assembling direction D1 is referred to as a first direction Z1 and a direction opposite to the first direction X1 is referred to as a first opposite direction X2. Further, out of directions orthogonal to the first direction X1, a direction toward an upper side in FIG. 3 is referred to as a second direction Y1 and a direction opposite to the second direction Y1 is referred to as a second opposite direction Y2. Out of directions orthogonal to both the first and second directions X1, Y1, a direction toward a left side in FIG. 3 is referred to as a third direction Z1 and a direction opposite to the third direction Z1 is referred to as a third opposite direction Z2. Note that directions in the connector 200 are described based on a state where the connector 30 is assembled with the connector 200.

(Configuration of Connector 30)

Figure 4:
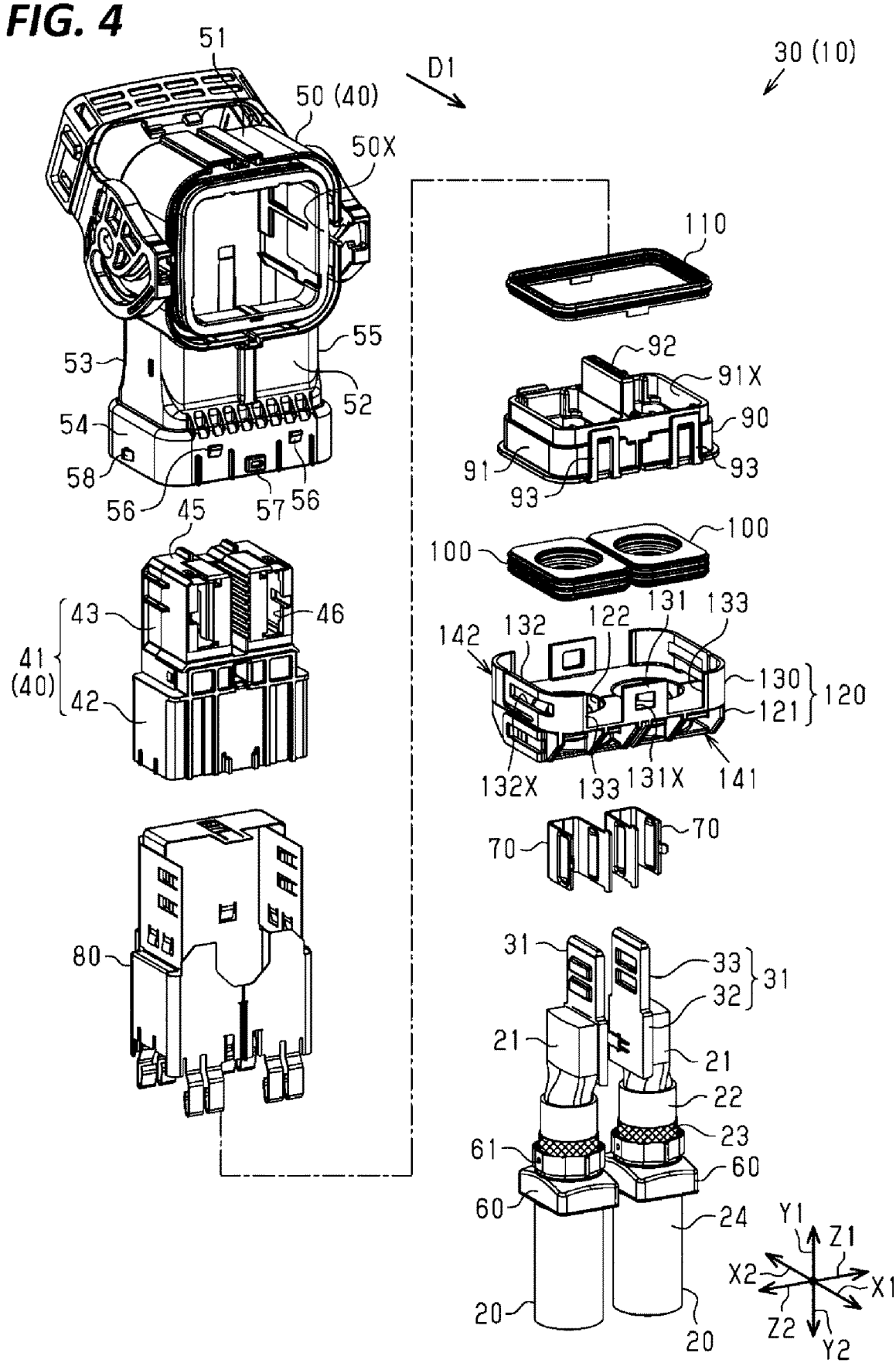
FIG. 4 is a schematic exploded perspective view showing a connector of the embodiment.

As shown in FIG. 4, the connector 30 includes the plurality of terminals 31 respectively connected to (particularly end parts of) a plurality of wires 20 and a (particularly substantially annular) connector housing 40 for at least partly accommodating the plurality of terminals 31. The connector housing 40 particularly includes an inner housing 41 for at least partly accommodating the terminals 31 and an outer housing 50 for at least partly covering the inner housing 41. The connector 30 includes, for example, one or more (two in this embodiment) conductive intervening members 60 to be mounted on the wires 20, and/or one of more (two in this embodiment) conductive leaf springs 70.

The connector 30 particularly includes a conductive inner shell 80 for at least partly covering the intervening members 60 and/or an inner member 90 for supporting the inner housing 41.

The connector 30 includes, for example, a plurality of (two in this embodiment) sealing members 100 to be fit inside the inner member 90, one sealing member 110 to be fit outside the inner member 90 and/or a retainer 120 for retaining the sealing member 100.

(Configuration of Wires 20)

Figure 5:
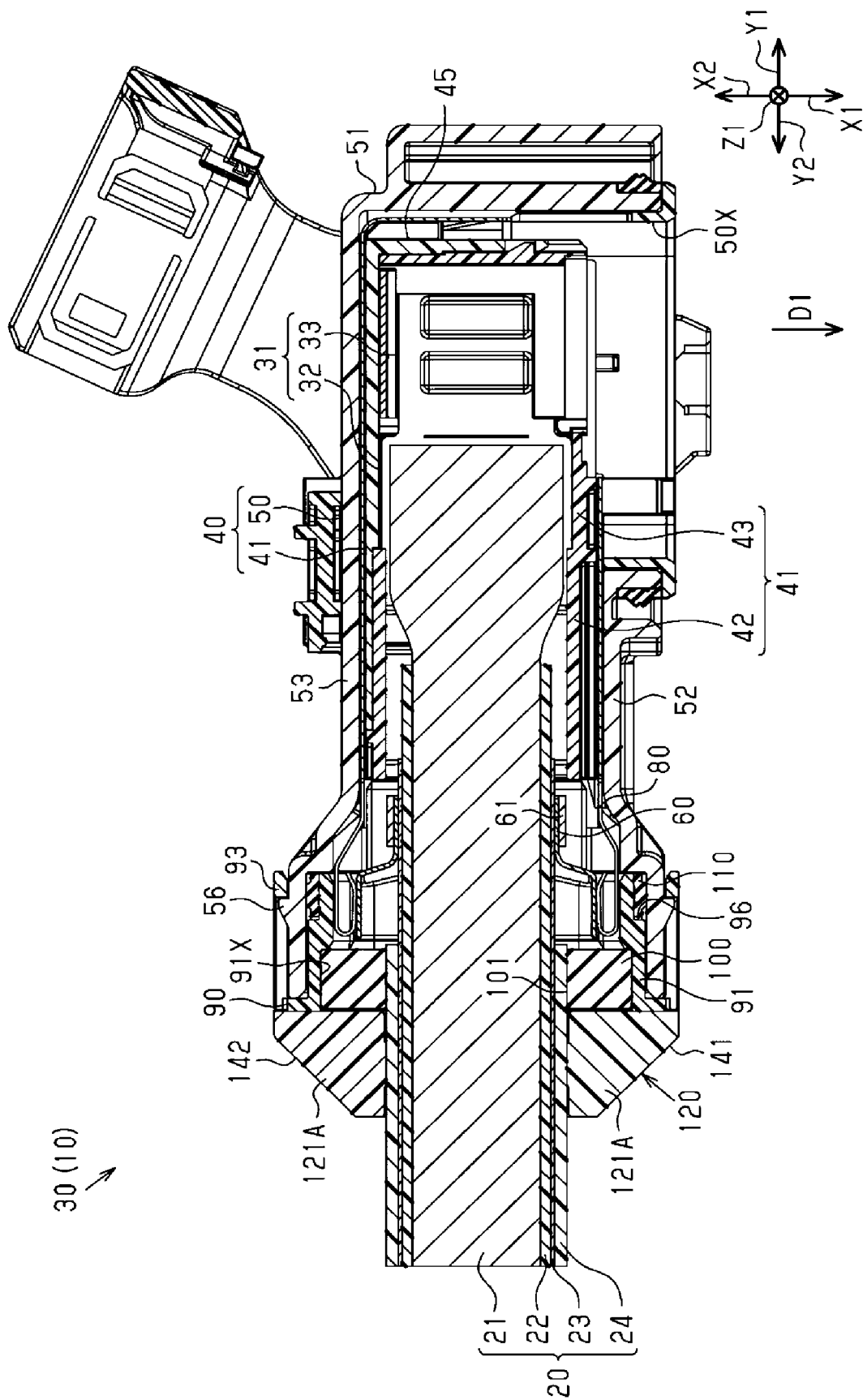
FIG. 5 is a schematic section showing the connector of the embodiment.
Figure 6:
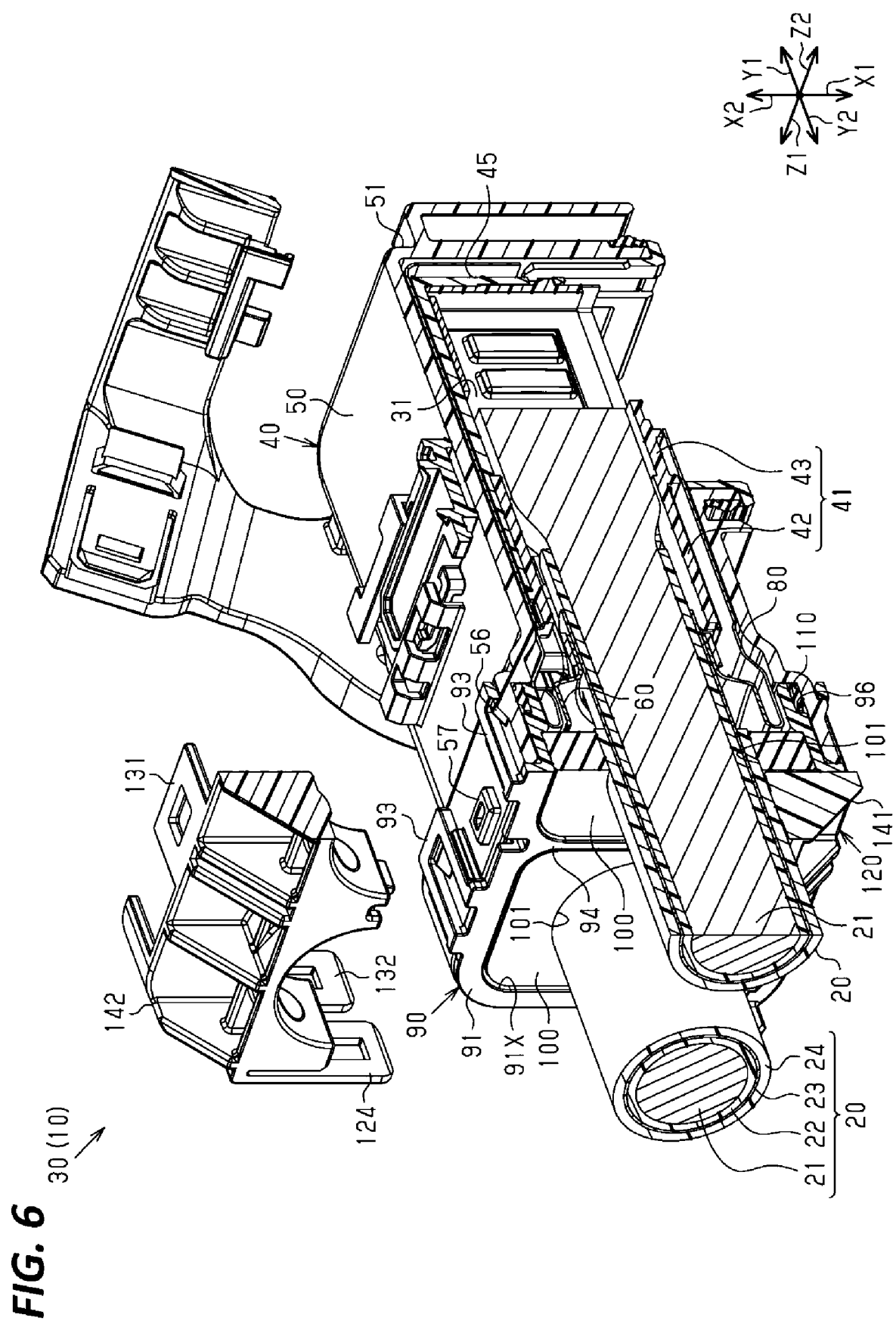
FIG. 6 is a schematic exploded perspective view partly in section showing the connector of the embodiment.

As shown in FIGS. 5 and 6, each wire 20 includes a conductive core 21 and an insulating sheath 22 surrounding the outer periphery of the core 21. Each wire 20 particularly includes a conductive electromagnetic shield member 23 at least partly surrounding the outer periphery of the sheath 22 and/or an insulating insulation coating 24 at least partly surrounding the outer periphery of the electromagnetic shield member 23. Each wire 20 is, for example, a shielded wire having an electromagnetic shielding structure itself.

A stranded wire formed by twisting a plurality of metal strands, a columnar conductor having a solid structure inside and made of one columnar metal bar, a tubular conductor having a hollow structure inside and the like can be, for example, used as the core 21. Further, a combination of a stranded wire, a columnar conductor and/or a tubular conductor may be used as the core 21. A copper-based or aluminum-based metal material can be, for example, used as a material of the core 21.

The sheath 22 covers, for example, the outer peripheral surface of the core 21 over the substantially entire periphery in a circumferential direction. The sheath 22 is, for example, made of an insulating resin material.

The electromagnetic shield member 23 surrounds, for example, the outer peripheral surface of the sheath 22 over the substantially entire periphery in the circumferential direction. The electromagnetic shield member 23 is, for example, flexible. A braided wire formed by braiding a plurality of metal strands into a tubular shape and/or a metal foil can be, for example, used as the electromagnetic shield member 23. The electromagnetic shield member 23 of this embodiment is a braided wire. A copper-based or aluminum-based metal material can be, for example, used as a material of the electromagnetic shield member 23.

The insulation coating 24 surrounds, for example, the outer peripheral surface of the electromagnetic shield member 23 over the substantially entire periphery in the circumferential direction. The insulation coating 24 is, for example, made of an insulating resin material.

A part (particularly an end part in the second direction Y1) of the core 21 is exposed from the sheath 22. The terminal 31 is connected to the (end) part of the core 21 exposed from the sheath 22. A corresponding part (particularly an end part in the second direction Y1) of the electromagnetic shield member 23 is exposed from the insulation coating 24. The intervening member 60 is connected or connectable to (particularly the end part of) the electromagnetic shield member 23 exposed from the insulation coating 24.

(Configuration of Terminals 31)

As shown in FIG. 4, a plurality of (e.g. two) terminals 31 are respectively electrically connected to the plurality of (e.g. two) wires 20. The (particularly each) terminal 31 includes, for example, a wire connecting portion 32 to be connected to (particularly an end part of) the wire 20 and a terminal connecting portion 33. The (particularly each) terminal 31 is, for example, a single component in which the wire connecting portion 32 and the terminal connecting portion 33 are integrally or unitarily formed. A conductive (particularly metal) material such as copper, copper alloy, aluminum, aluminum alloy or stainless steel can be, for example, used as a material of each terminal 31.

The wire connecting portion 32 is connected to (the end part of) the core 21 exposed from the sheath 22. The wire connecting portion 32 is, for example, in the form of a substantially flat plate. The wire connecting portion 32 is, for example, connected to the core 21 by crimping, ultrasonic welding or the like. In this way, the wire connecting portion 32 and/or the core 21 are electrically and mechanically connected.

The terminal connecting portion 33 is, for example, in the form of a substantially flat plate. As shown in FIG. 3, the terminal connecting portion 33 is electrically and mechanically connected to the terminal 201 of the connector 200.

(Configuration of Intervening Members 60)

As shown in FIG. 4, the (e.g. two) intervening members 60 are respectively mounted on the (e.g. two) wires 20. As shown in FIG. 5, each intervening member 60 is mounted on the outer periphery of (particularly an end part of) the electromagnetic shield member 23 exposed from the insulation coating 24. The (particularly each) intervening member 60 particularly substantially is formed into an annular shape. The (particularly each) intervening member 60 particularly substantially is formed into an annular shape in conformity with the outer peripheral surface of the wire 20.

The outer periphery of the (particularly each) intervening member 60 is, for example, surrounded by the outer housing 50 and the inner shell 80. The (particularly each) intervening member 60 is in contact with each electromagnetic shield member 23 and/or the inner shell 80. Each intervening member 60 electrically connects each electromagnetic shield member 23 and/or the inner shell 80. A copper-based or aluminum-based metal material can be, for example, used as a material of each intervening member 60.

One end part in an axial direction of each intervening member 60 is, for example, connected to the outer peripheral surface of the electromagnetic shield member 23 particularly by a fixing member 61. The fixing member 61 particularly substantially fixes the intervening member 60 to the outer peripheral surface of the wire 20 with the intervening member 60 held in contact with the electromagnetic shield member 23.

The fixing member 61 particularly substantially is formed into an annular shape in conformity with the outer peripheral surface of the wire 20. The fixing member 61 is fit or fittable outside the wire 20 while sandwiching the one end part in the axial direction of the intervening member 60 between the outer peripheral surface of the electromagnetic shield member 23 of the wire 20 and the fixing member 61.

By particularly fastening the fixing member 61 radially inwardly of the wire 20, the one end part in the axial direction of the intervening member 60 is crimped and fixed directly in contact with the outer peripheral surface of the electromagnetic shield member 23. In this way, the electromagnetic shield member 23 and the intervening member 60 are electrically and mechanically connected to each other. A crimp ring or crimp band can be, for example, used as the fixing member 61.

(Configuration of Leaf Springs 70)

As shown in FIG. 4, the (e.g. two) leaf springs 70 are respectively provided to correspond to the (e.g. two) wires 20. An iron-based or copper-based metal material can be used as a material of each leaf spring 70.

The (particularly each) leaf spring 70 particularly substantially is formed into a U shape in a plan view viewed from the second direction Y1.

(Configuration of Inner Housing 41)

The inner housing 41 includes, for example, a base portion 42 and one or more terminal accommodating portions 43 substantially extending in the second direction Y1 from the base portion 42. The inner housing 41 is, for example, made of an insulating resin material. The inner housing 41 is, for example, a component separate from the outer housing 50.

Figure 7:
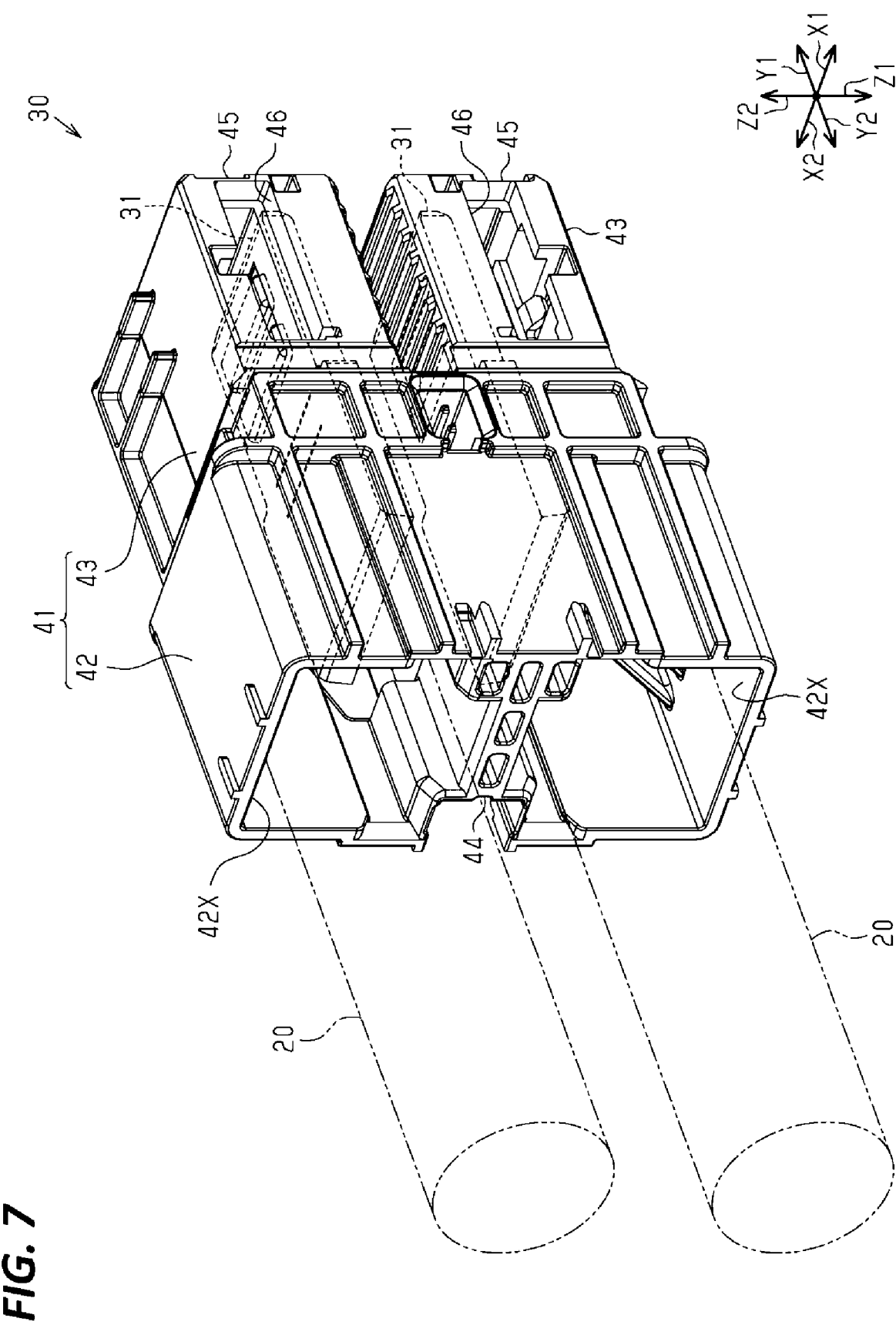
FIG. 7 is a schematic perspective view showing a part of the connector of the embodiment.

As shown in FIG. 7, the base portion 42 is provided on an end part in the second opposite direction Y2 of the inner housing 41. The base portion 42 particularly substantially is formed into an annular shape.

The base portion 42 includes one or more, for example, two through holes 42X, through which the (e.g. two) wires 20 are (particularly individually) passed.

The (particularly each) through hole 42X penetrates through the base portion 42 in the second direction Y1.

The base portion 42 particularly includes a partition wall 44 at least partly partitioning the adjacent (e.g. two) through holes 42X. The partition wall 44 is provided between the two through holes 42X in the third direction Z1. The partition wall 44 extends, for example, over the substantially entire length of the base portion 42 in the second direction Y1.

The terminal accommodating portions 43 at least partly accommodate the (e.g. two) terminals 31. The terminal accommodating portions 43 are, for example, provided to substantially correspond to the (two) terminals 31. That is, the inner housing 41 includes a corresponding number (e.g. two) terminal accommodating portions 43.

The (two) terminal accommodating portions 43 are provided while being spaced apart in the third direction Z1. The (two) terminal accommodating portions 43 are commonly coupled to one base portion 42. In other words, the (two) terminal accommodating portions 43 are integrally or unitarily formed through the base portion 42.

The (particularly each) terminal accommodating portion 43 is, for example, in the form of a box substantially extending along the second direction Y1 from the base portion 42. In other words, each terminal accommodating portion 43 is, for example, substantially in the form of a bottomed ring having a bottom wall 45. The bottom wall 45 is constituted by a peripheral wall substantially in the second direction Y1 of the terminal accommodating portion 43.

An internal space of the (each) terminal accommodating portion 43 communicates with the (each) through hole 42X of the base portion 42. The terminal 31 at least partly is accommodated in the internal space of the (each) terminal accommodating portion 43.

Specifically, each terminal accommodating portion 43 includes an insertion hole 46 into which the terminal 201 (see FIG. 2) of the connector 200 is inserted. Each insertion hole 46 communicates with the internal space of each terminal accommodating portion 43.

(Configuration of Outer Housing 50)

As shown in FIGS. 4 to 6, the outer housing 50 at least partly surrounds the outer periphery of the inner housing 41. In other words, the inner housing 41 at least party is accommodated inside the outer housing 50.

The outer housing 50 is, for example, in the form of a bottomed ring having a bottom wall 51. For example, the outer periphery 50 is in the form of a bottomed ring open in the second direction Y2 and/or having an opening in the second direction Y1 closed by the bottom wall 51.

As shown in FIG. 4, the outer housing 50 includes the bottom wall 51, a peripheral wall 52 substantially provided in the first direction X1, a peripheral wall 53 substantially provided in the first opposite direction X2, a peripheral wall 54 substantially provided in the third opposite direction Z2 and/or a peripheral wall 55 substantially provided in the third direction Z1.

The outer housing 50 includes an opening 50X for exposing the one or more insertion holes 46 of the terminal accommodating portions 43. The opening 50X is provided in the peripheral wall 52 substantially in the first direction X1 of the outer housing 50.

The opening 50X particularly is provided on an end part in the second direction Y1 of the peripheral wall 52, i.e. an end part of the peripheral wall 52 on the side of the bottom wall 51. The opening 50X particularly penetrates through the peripheral wall 52 substantially along the first direction X1 parallel to the assembling direction D1. The opening 50X communicates with an internal space of the outer housing 50.

One or more (four in this embodiment) engaging portions 56, one or more (two in this embodiment) engaging portions 57 and/or one or more (two in this embodiment) engaging portions 58 are provided on the outer peripheral surface of the outer housing 50.

The one or more engaging portions 56 are, for example, provided on the outer surface of an end part in the second opposite direction Y2 of the peripheral wall 52.

In this embodiment, two engaging portions 56 are provided on the outer surface of the peripheral wall 52 on the end part in the second opposite direction Y2. The two engaging portions 56 are, for example, provided away from each other in the third direction Z1.

The (particularly each) engaging portion 56 is, for example, formed to project radially outwardly of the outer housing 50 from the outer surface of the peripheral wall 52.

The engaging portion 57 is, for example, provided on the outer surface of the end part in the second opposite direction Y2 of the peripheral wall 52. In this embodiment, one engaging portion 56 is provided on the outer surface of the peripheral wall 52 on the end part in the second opposite direction Y2.

The one engaging portion 57 is provided at a position shifted from the one or more (e.g. two) engaging portions 56 in the third direction Z1.

The one engaging portion 57 is provided between the two engaging portions 56 in the third direction Z1. The one engaging portion 57 particularly is provided at the position shifted from the two engaging portions 56 in the second direction Y1.

The one engaging portion 57 is, for example, provided further on the side in the second opposite direction Y2 than the two engaging portions 56. The one engaging portion 57 is, for example, formed to project radially outwardly of the outer housing 50 from the outer surface of the peripheral wall 52.

Note that, as shown in FIG. 3, two engaging portions 56 and one engaging portion 57 are similarly provided also on the peripheral wall 53.

The engaging portion 58 is, for example, provided on the outer surface of an end part in the second opposite direction Y2 of the peripheral wall 54. In this embodiment, one engaging portion 58 is provided on the outer surface of the peripheral wall 54 on the end part in the second opposite direction Y2.

The one engaging portion 58 particularly is provided at a position shifted from the (e.g. two) engaging portions 56 in the second direction Y1. The one engaging portion 58 is, for example, provided further on the side in the second opposite direction Y2 than the (two) engaging portions 56.

The one engaging portion 58 is, for example, provided at the same position as the one engaging portion 57 in the second direction Y1. The one engaging portion 58 is, for example, formed to project radially outwardly of the outer housing 50 from the outer surface of the peripheral wall 54. Note that, although not shown, the one engaging portion 58 is similarly provided also on the peripheral wall 55.

(Configuration of Inner Shell 80)

As shown in FIG. 4, the inner shell 80 is, for example, substantially formed into an annular shape extending in the second direction Y1. A copper-based, aluminum-based or iron-based metal material can be, for example, used as a material of the inner shell 80.

As shown in FIGS. 5 and 6, the inner shell 80 particularly at least partly is accommodated inside the outer housing 50. The inner shell 80 is provided between the inner peripheral surface of the outer housing 50 and the outer peripheral surface of the inner housing 40, the outer peripheral surfaces of the intervening members 60 in a radial direction of the outer housing 50.

An end part in the second opposite direction Y2 of the inner shell 80 particularly is in contact with the outer peripheral surfaces of the intervening members 60. In this way, the inner shell 80 is electrically connected to the intervening members 60.

(Configuration of Inner Member 90)

Figure 8:
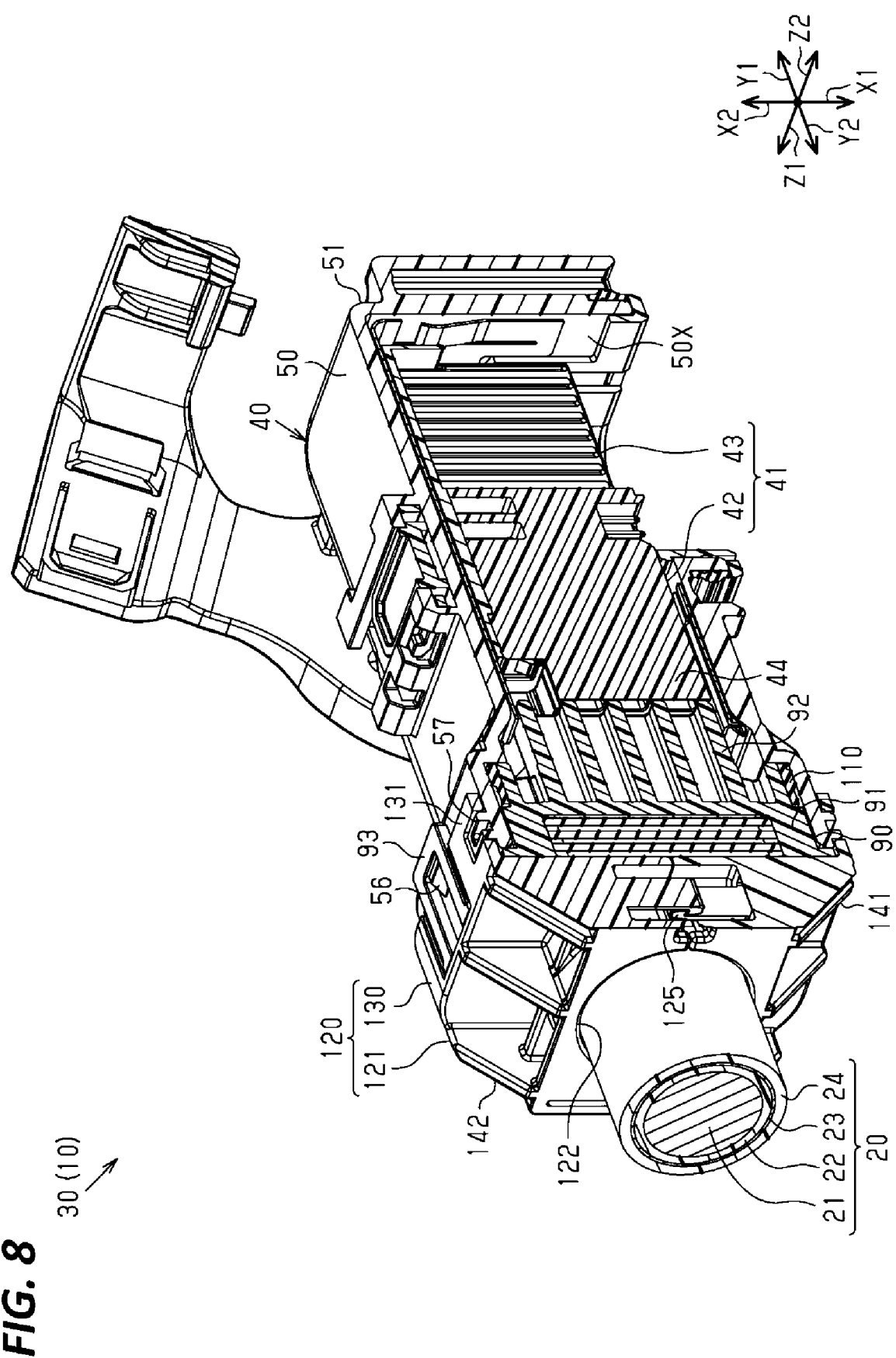
FIG. 8 is a schematic perspective view partly in section showing the connector of the embodiment.

As shown in FIG. 8, the inner member 90 particularly is mounted on an end part in the second opposite direction Y2 of the outer housing 50. The inner member 90 is, for example, a component separate from the inner housing 41 and separate from the outer housing 50.

A part of the inner member 90 particularly at least partly is accommodated inside the outer housing 50. The inner member 90 particularly supports the inner housing 41 inside the outer housing 50. The inner member 90 supports the inner housing 41, for example, by pressing the inner housing 41 toward the inner surface of the bottom wall 51 inside the outer housing 50.

Figure 9:
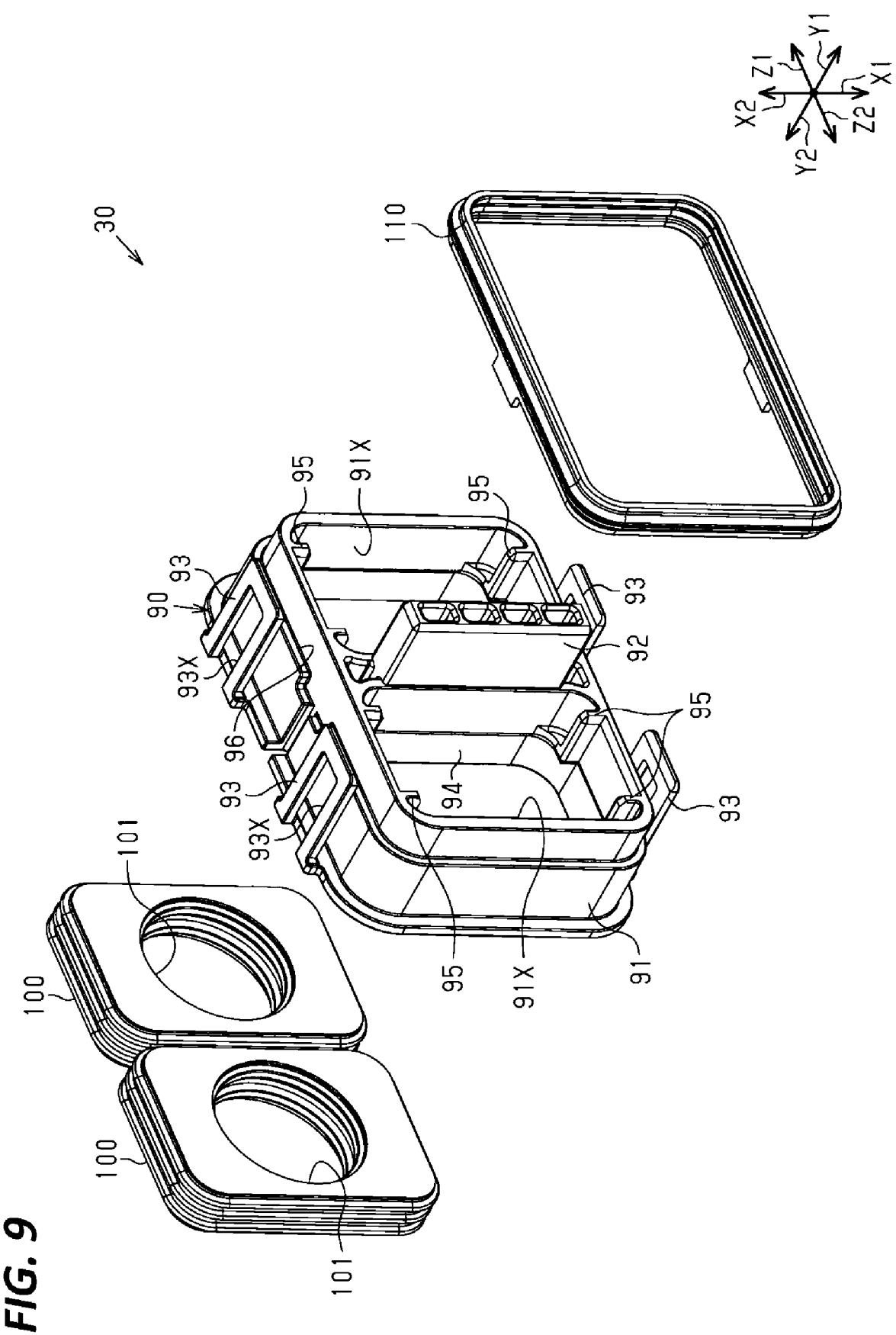
FIG. 9 is a schematic exploded perspective view showing a part of the connector of the embodiment.

As shown in FIG. 9, the inner member 90 particularly includes a body portion 91, a projecting portion 92 substantially projecting in the second direction Y1 from an end surface in the second opposite direction Y2 of the body portion 91 and/or one or more (four in this embodiment) engaging portions 93.

The inner member 90 is, for example, a single component in which the body portion 91, the projecting portion 92 and the engaging portions 93 are integrally or unitarily formed. The inner member 90 is, for example, made of an insulating resin material.

The body portion 91 particularly substantially is formed into an annular shape. The body portion 91 particularly substantially is in the form of a rectangular ring as a whole. The body portion 91 includes, for example, one or more (e.g. two) through holes 91X through which the one or more (e.g. two) wires 20 (see FIG. 5) are individually passed.

One or more (e.g. two) sealing members 100 are individually fit into the respective (e.g. two) through holes 91X. The (particularly each) through hole 91X penetrates through the body portion 91 in the second direction Y1.

The (particularly each) through hole 91X is, for example, substantially formed to have a rectangular plan view shape when viewed from a penetration direction of the through hole 91X.

The body portion 91 particularly includes a partition wall 94 at least partly partitioning the adjacent (e.g. two) through holes 91X. The partition wall 94 particularly is provided between the two through holes 91X in the third direction Z1. The partition wall 94 extends, for example, over the substantially entire length in the second direction Y1 of the body portion 91.

The body portion 91 particularly includes one or more (four in this embodiment) restricting walls 95 provided on the inner peripheral surface of the (particularly each) through hole 91X. The (particularly each) restricting wall 95 is formed to project radially inwardly of the through hole 91X from the inner peripheral surface of the through hole 91X in an end part in the second direction Y1. For example, each restricting wall 95 extends from a central or intermediate part in the second direction Y1 of the body portion 91 towards or to an end surface in the second direction Y1 of the body portion 91.

A groove portion 96 into which the sealing member 110 at least partly is mounted or mountable particularly is provided in the outer peripheral surface of the body portion 91. The groove portion 96 is provided in the outer peripheral surface of the body portion 91 on the end part in the second direction Y1.

The groove portion 96 particularly is formed to be recessed radially inwardly of the body portion 91 from the outer peripheral surface of the body portion 91.

The groove portion 96 particularly is continuously formed over the entire periphery in a circumferential direction of the body portion 91. The groove portion 96 extends, for example, from the central part in the second direction Y1 of the body portion 91 to the end surface in the second direction Y1 of the body portion 91.

The projecting portion 92 projects, for example, in the second direction Y1 from an end surface in the second direction Y1 of the partition wall 94. For example, the projecting portion 92 extends in the first direction X1 and has a specified (predetermined or predeterminable) thickness in the third direction Z1.

As shown in FIG. 8, the projecting portion 92 particularly contacts the partition wall 44 of the base portion 42 when the inner member 90 is mounted on the outer housing 50. The tip surface of the projecting portion 92, i.e. an end surface in the second direction Y1 of the projecting portion 92, contacts an end surface in the second opposite direction Y2 of the partition wall 44.

The projecting portion 92 particularly supports the inner housing 41 inside the outer housing 50, for example, by contacting the partition wall 44 and pressing the inner housing 41 toward the bottom wall 51.

Figure 10:
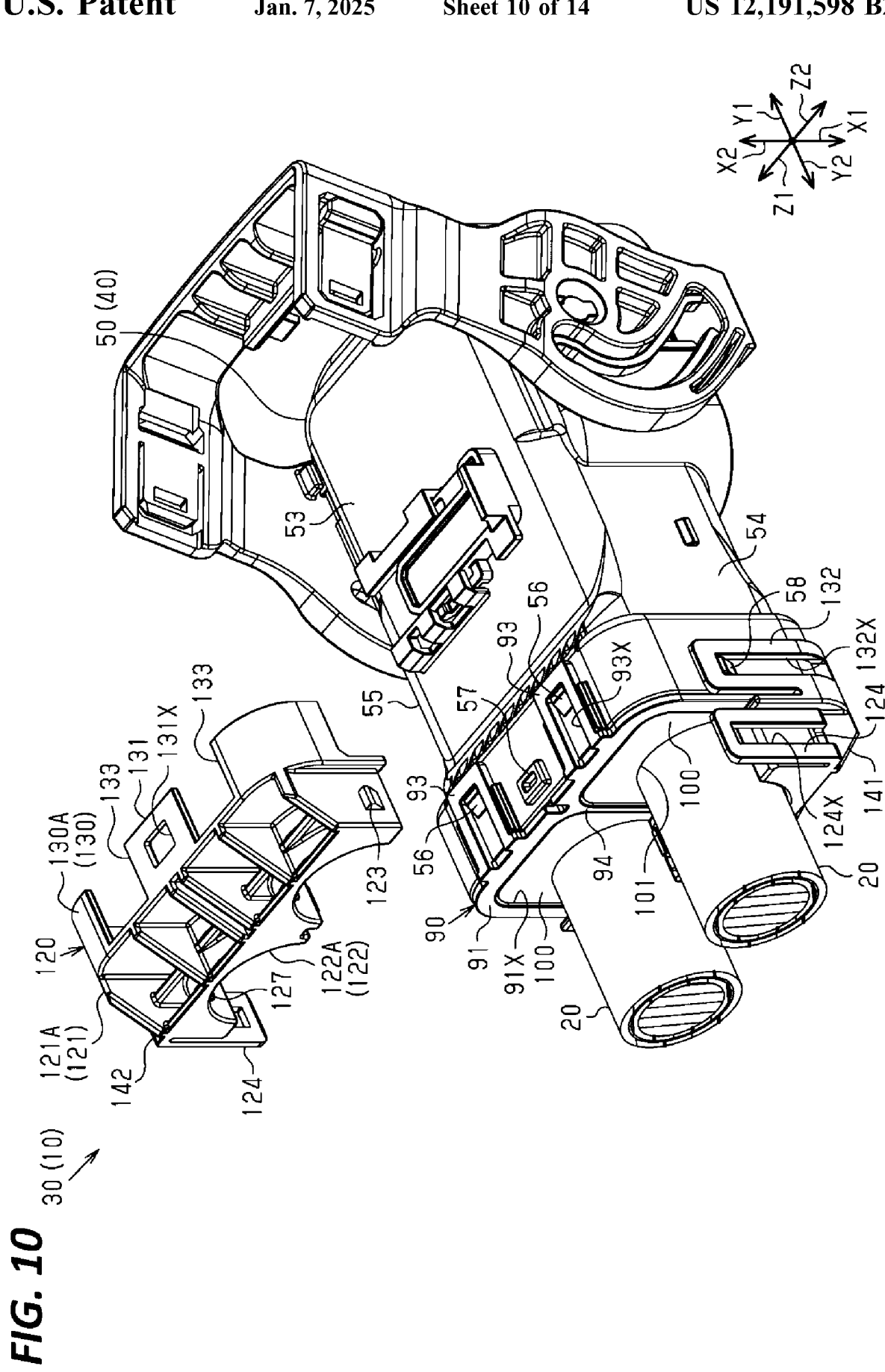
FIG. 10 is a schematic exploded perspective view showing the connector of the embodiment.

As shown in FIG. 10, one or more (e.g. four) engaging portions 93 are provided to correspond to the one or more (e.g. four) engaging portions 56 of the outer housing 50.

The (each) engaging portion 93 is, for example, formed to substantially project in the second direction Y1 from an end part in the second opposite direction Y2 of the body portion 91.

As shown in FIG. 9, each engaging portion 93 particularly is provided away from the outer peripheral surface of the body portion 91 in the first direction X1.

The (particularly each) engaging portion 93 particularly is in the form of a cantilever having a base end part connected to the body portion 91 as a fixed end and a tip part on a side opposite to the base end part in the second direction Y1 as a free end. The (each) engaging portion 93 is configured to be deflectable substantially in the first direction X1 by being resiliently deformed.

As shown in FIG. 10, each engaging portion 93 particularly includes an engaging hole 93X, with which the engaging portion 56 is engaged. The engaging hole 93X extends, for example, along the second direction Y1.

The engaging portions 93, 56 are engaged with each other, for example, by a snap-fit method. By engaging the engaging portions 93 and 56 with each other, the inner member 90 is fixed to the outer housing 50.

(Configuration of Sealing Members 100, 110)

As shown in FIG. 6, the (e.g. two) sealing members 100 are respectively provided to correspond to the (e.g. two) wires 20. The (particularly each) sealing member 100 is mounted or mountable on the outer peripheral surface of the (two) wires 20.

The plurality of sealing members 100 particularly are individually fit inside the plurality of through holes 91X.

The (particularly each) sealing member 100 particularly is in the form of a ring having an outer peripheral surface along the inner peripheral surface of the through hole 91X.

The (particularly each) sealing member 100 includes a through hole 101 through which the (each) wire 20 is passed. The inner peripheral surface of the through hole 101 particularly is shaped in conformity with the outer peripheral surface of the wire 20.

The (particularly each) sealing member 100 is configured to be resiliently deformable. The (particularly each) sealing member 100 is to be held in close contact with the outer peripheral surface of the wire 20 and the inner peripheral surface of the through hole 91X.

The (particularly each) sealing member 100 seals between the outer peripheral surface of the wire 20 and the inner peripheral surface of the inner member 90. Note that an end surface in the second direction Y1 of each sealing member 100 is in contact with the restricting walls 95 shown in FIG. 9.

By the contact of each sealing member 100 with the restricting walls 95, an insertion amount of each sealing member 100 into each through hole 91X is restricted. In other words, the restricting walls 95 function to position each sealing member 100 inside each through hole 91X.

As shown in FIG. 6, the sealing member 110 is mounted or mountable on the outer peripheral surface of the inner member 90. The sealing member 110 is, for example, mounted on the bottom surface of the groove portion 96 of the body portion 91.

The sealing member 110 particularly is provided inside the outer housing 50. The sealing member 110 particularly substantially is in the form of a ring continuous over the entire periphery in a circumferential direction of the inner member 90.

The outer peripheral surface of the sealing member 110 particularly is shaped in conformity with the inner peripheral surface of the outer housing 50. The inner peripheral surface of the sealing member 110 particularly substantially is shaped in conformity with the outer peripheral surface of the inner member 90.

The sealing member 110 is configured to be resiliently deformable. The sealing member 110 is, for example, held in close contact with the outer peripheral surface of the inner member 90 and/or the inner peripheral surface of the outer housing 50. The sealing member 110 particularly seals between the outer peripheral surface of the inner member 90 and the inner peripheral surface of the outer housing 50.

The sealing members 100, 110 are, for example, made of rubber. For example, nitrile rubber, silicone rubber, urethane rubber, acrylic rubber, butyl rubber, ethylene propylene rubber and the like can be used as a material of the sealing members 100, 110.

(Configuration of Retainer 120)

As shown in FIG. 5, the retainer 120 is mounted on an end part in the second opposite direction Y2 of the outer housing 50. The retainer 120 particularly retains the inner member 90 and the sealing members 100 in the connector housing 40.

The retainer 120 is, for example, made of an insulating resin material. The retainer 120 is, for example, a component separate from the inner housing 41, the outer housing 50 and/or the inner member 90.

The retainer 120 is, for example, provided to partially cover the outer periphery of the outer housing 50. The retainer 120 is, for example, in contact with an end surface in the second opposite direction Y2 of the inner member 90.

The retainer 120 is, for example, in contact with end surfaces in the second opposite direction Y2 of the sealing members 100. Note that the inner member 90 is sandwiched by the outer housing 50 and the retainer 120 in the second direction Y1.

As shown in FIG. 8, the retainer 120 includes a body portion 121 and a receptacle 130 projecting in the second direction Y1 from the body portion 121.

The body portion 121 includes one or more (e.g. two) wire through holes 122, through which the (e.g. two) wires 20 are individually passed.

The (particularly each) wire through hole 122 penetrates through the body portion 121 in the second direction Y1. The receptacle 130 at least partly covers, for example, the outer peripheral surface of the outer housing 50.

As shown in FIG. 10, the receptacle 130 includes one or more engaging portions 131 to be engaged with the one or more engaging portions 57 of the outer housing 50 and/or one or more engaging portions 132 to be engaged with the engaging portions 58 of the outer housing 50.

Figure 11:
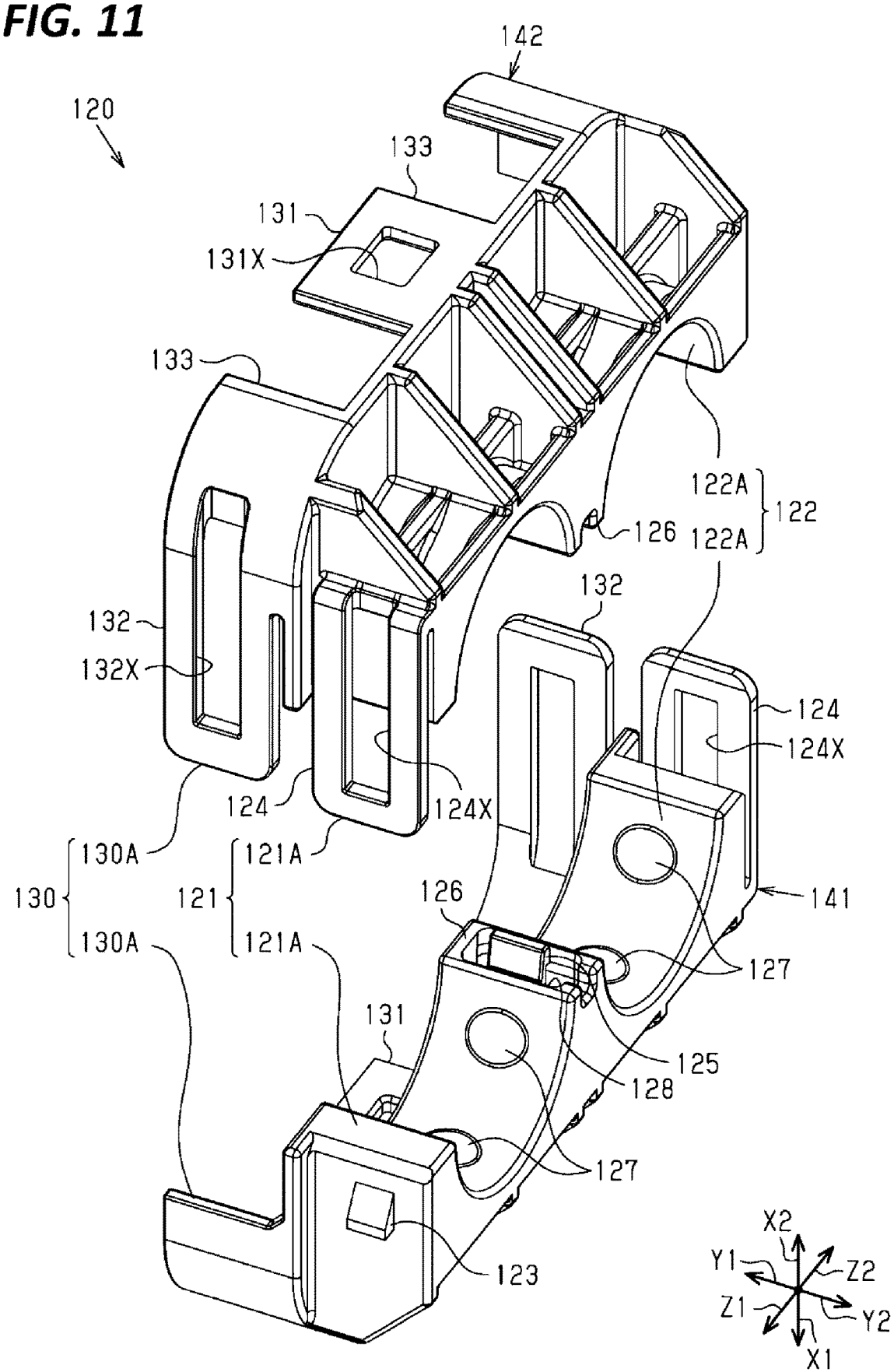
FIG. 11 is a schematic exploded perspective view showing a retainer of the embodiment.
Figure 12:
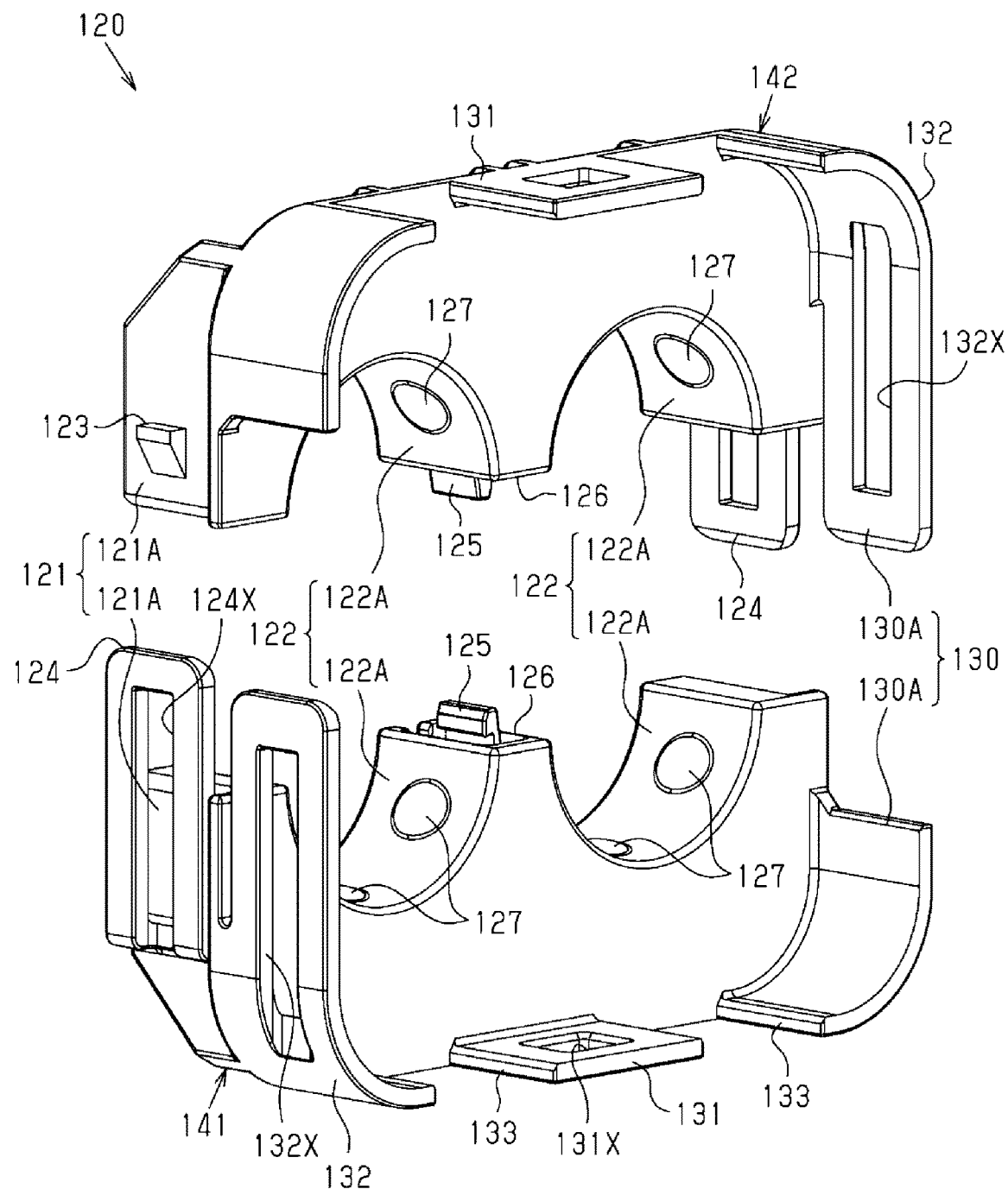
FIG. 12 is a schematic exploded perspective view showing the retainer of the embodiment.
Figure 12:
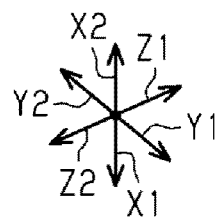

As shown in FIGS. 11 and 12, the retainer 120 particularly is composed of a plurality of (two in this embodiment) divided bodies 141, 142. The retainer 120 is configured by uniting the (two) divided bodies 141, 142. The (two) divided bodies 141, 142 have, for example, the same shape.

(Configuration of Divided Bodies 141, 142)

The divided body 141 particularly includes a divided body portion 121A and a divided receptacle 130A. Similarly, the divided body 142 includes a divided body portion 121A and a divided receptacle 130A.

The (particularly each) divided body 141, 142 is, for example, a single component in which the divided body portion 121A and/or the divided receptacle 130A are integrally or unitarily formed.

In the retainer 120, the body portion 121 particularly is configured by assembling the divided body portion 121A of the divided body 141 and the divided body portion 121A of the divided body 142.

In the retainer 120, the receptacle 130 particularly is configured by assembling the divided receptacle 130A of the divided body 141 and the divided receptacle 130A of the divided body 142. The structure of the divided body 141, out of the two divided bodies 141, 142, is described in detail below, but the structure of the divided body 142 is not described in detail.

(Configuration of Divided Body 141)

The divided body portion 121A includes one or more, particularly a plurality of divided through holes 122A constituting or forming part of the wire through holes 122, an engaging portion 123, an engaging portion 124 and/or an engaging portion 125.

The divided body portion 121A particularly has a facing surface 126 facing the other divided body 142. The facing surface 126 of the divided body 141 is a surface in the first opposite direction X2 of the divided body portion 121A.

The (particularly each) divided through hole 122A particularly is formed by being recessed from the facing surface 126 in the first direction X1, i.e. a direction away from the other divided body 142. The inner surface of each divided through hole 122A particularly is formed into an arcuately curved surface.

The inner surface of each divided through hole 122A is, for example, formed into a semicircular shape when viewed from the second direction Y1.

When the pair of divided bodies 141, 142 are united, the wire through holes 122 particularly are configured by the divided through holes 122A of the divided body 141 and the divided through holes 122A of the divided body 142. The plurality of divided through holes 122A particularly are provided while being spaced apart in the third direction Z1.

One or more (three in this embodiment) projecting portions 127 projecting radially inwardly of the wire through hole 122 from the inner surface of the divided through hole 122A particularly are provided on the inner surface of each divided through hole 122A. The plurality of projecting portions 127 are, for example, provided while being spaced apart in a circumferential direction of the wire through hole 122.

The (particularly each) projecting portion 127 particularly presses the wire 20 (see FIG. 10) passed through the wire through hole 122 radially inwardly of the wire through hole 122. The (particularly each) projecting portion 127 can be formed into an arbitrary shape. For example, the (each) projecting portion 127 of this embodiment is formed into a hemispherical shape.

As shown in FIG. 11, the engaging portion 123 particularly is provided on the outer surface of the divided body portion 121A. The engaging portion 123 is, for example, provided on one end surface in a width direction of the divided body portion 121A. Here, the width direction of the divided body portion 121A extends along the third direction Z1.

The engaging portion 123 of this embodiment is provided on an end surface in the third direction Z1 of the divided body portion 121A. The engaging portion 123 is formed to project in the third direction Z1 from the surface in the third direction Z1 of the divided body portion 121A.

The engaging portion 124 particularly is provided on the outer surface of the divided body portion 121A. The engaging portion 124 is, for example, provided on an end part on a side opposite to the engaging portion 123, out of end parts in the width direction of the divided body portion 121A. The engaging portion 124 of this embodiment is provided on an end part in the third opposite direction Z2 of the divided body portion 121A.

As shown in FIG. 12, the engaging portion 124 is, for example, formed to project in the first opposite direction X2 from an intermediate part in the first direction X1 of the divided body portion 121A.

A tip part of the engaging portion 124 particularly projects further in the first opposite direction X2 than the facing surface 126. The engaging portion 124 particularly substantially is in the form of a cantilever with a base end part as a fixed end the tip part as a free end. The engaging portion 124 is configured to be deflectable in the third direction Z1 by being resiliently deformed.

The (particularly each) engaging portion 124 includes an engaging hole 124X, with which the engaging portion 123 of the other divided body 142 is engaged. The engaging hole 124X extends along the first direction X1.

The engaging portion 124 of the divided body 141 and the engaging portion 123 of the divided body 142 are engaged with each other, for example, by the snap-fit method. Similarly, the engaging portion 123 of the divided body 141 and the engaging portion 124 of the divided body 142 are engaged with each other, for example, by the snap-fit method as shown in FIG. 11.

Figure 13:
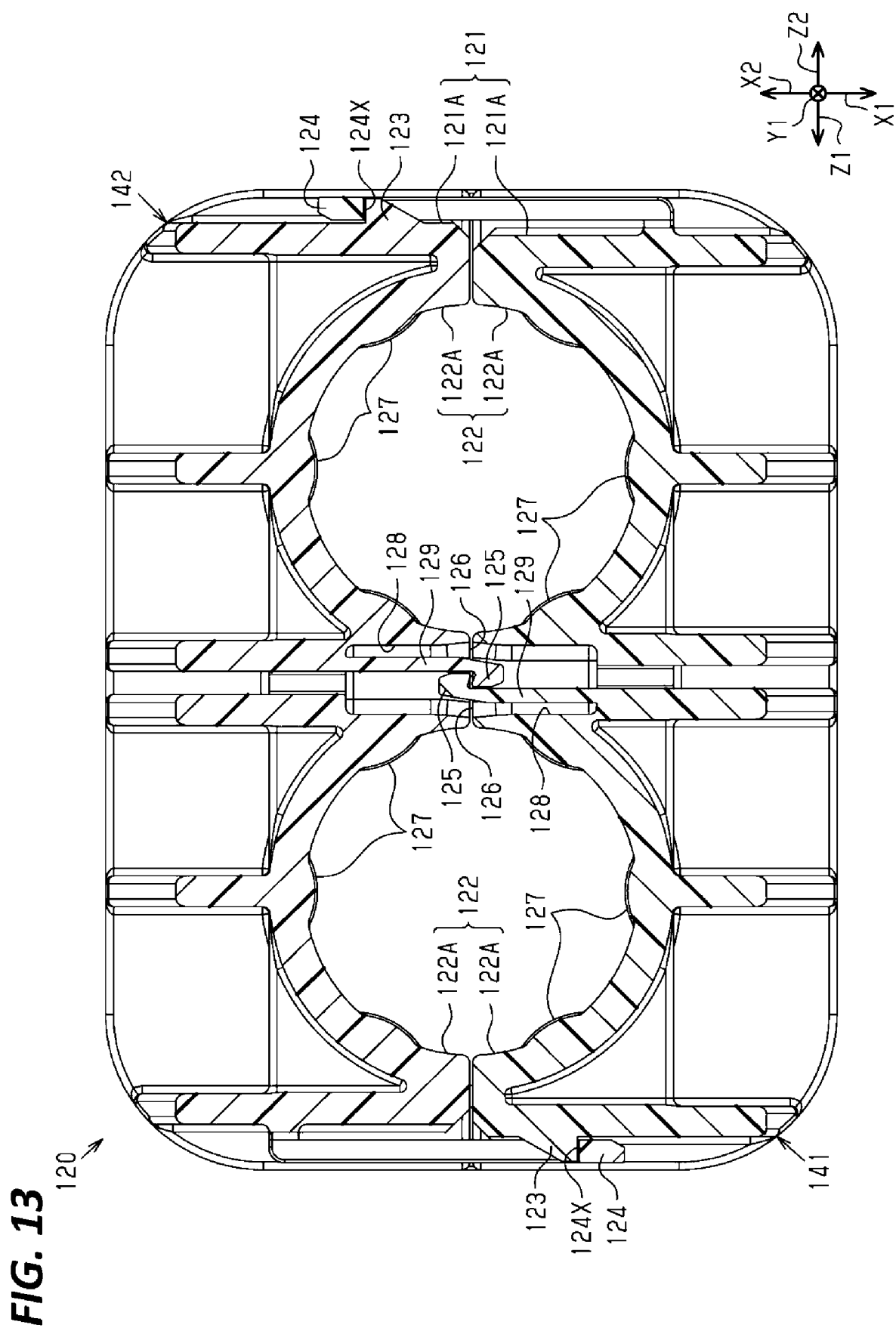
FIG. 13 is a schematic section showing the retainer of the embodiment.

As shown in FIG. 13, the engaging portions 125 particularly are provided inside the retainer 120. The engaging portions 125 are provided inside the retainer 120, i.e. at positions not to be exposed to the outside of the retainer 120 when the pair of divided bodies 141, 142 are united to configure the retainer 120.

The engaging portions 125 particularly are provided between the adjacent (e.g. two) wire through holes 122 in an arrangement direction of the (two) wire through holes 122, in particular, in the third direction Z1. Thus, one wire through hole 122 (first wire through hole), out of the two wire through holes 122, particularly is provided between the engaging portions 123 and 125 of one divided body 141 in the third direction Z1.

Further, the other wire through hole 122 (second wire through hole), out of the two wire through holes 122, is provided between the engaging portions 124 and 125 of the one divided body 141 in the third direction Z1.

The divided body portion 121A particularly includes at least one recess 128 provided in the facing surface 126 and/or a resiliently deformable resilient piece 129 substantially projecting toward the other divided body 142 from the bottom surface of the recess 128. The engaging portion 125 particularly is provided on a tip part of the resilient piece 129.

The recess 128 particularly is formed to be recessed in the first direction X1 from the facing surface 126 provided between the two divided through holes 122A in the width direction of the divided body portion 121A. The resilient piece 129 projects in the first opposite direction X2 from the bottom surface of the recess 128.

The resilient piece 129 particularly substantially is in the form of a cantilever having a base end part connected to the bottom surface of the recess 128 as a fixed end and a tip part on a side opposite to the base end part in the first direction X1 as a free end. The resilient piece 129 is configured to be deflectable in the third direction Z1 by being resiliently deformed.

The resilient piece 129 particularly is provided away from the inner peripheral surface of the recess 128.

Figure 14:
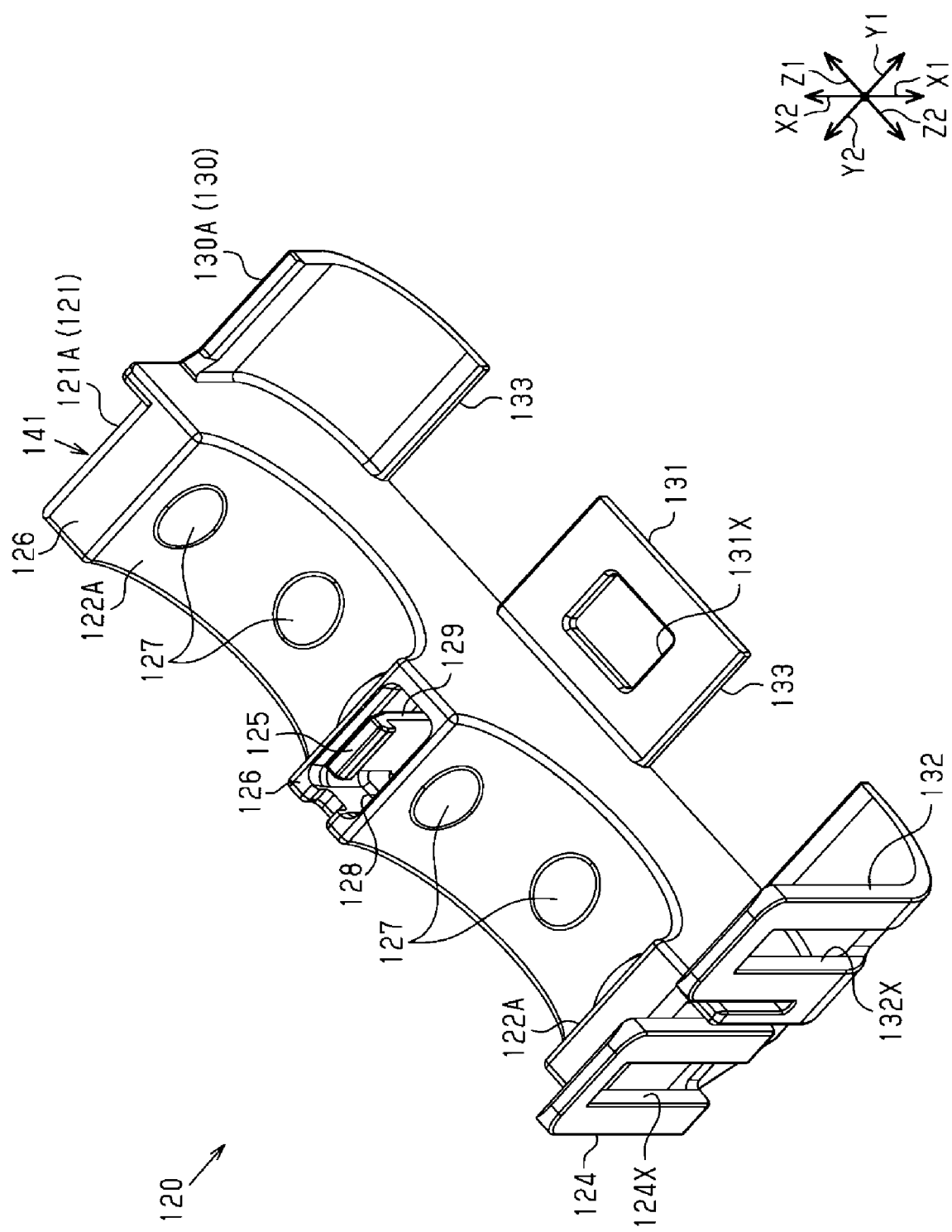
FIG. 14 is a schematic perspective view showing the retainer of the embodiment.

As shown in FIG. 14, the resilient piece 129 is provided away from the inner peripheral surface of the recess 128 particularly over the substantially entire periphery in a circumferential direction of the recess 128. In other words, the inner peripheral surface of the recess 128 surrounds over the substantially entire outer periphery of the resilient piece 129 in the circumferential direction while being separated from the resilient piece 129.

As shown in FIG. 13, the tip part of the resilient piece 129 particularly projects further toward the other divided body 142 than the facing surface 126.

The engaging portion 125 is, for example, provided on the tip part of the resilient piece 129 in a part projecting further in the first opposite direction X2 than the facing surface 126.

The engaging portion 125 is, for example, substantially in the form of a projection projecting in the third opposite direction Z2 from an end surface in the third opposite direction Z2 of the resilient piece 129.

The engaging portion 125 particularly is configured to be engageable with the engaging portion 125 of the other divided body 142. When the pair of divided bodies 141, 142 are united, the engaging portions 125 of the pair of divided bodies 141, 142 are engaged with each other.

The engaging portion 125 of the divided body 141 and the engaging portion 125 of the divided body 142 particularly are engaged with each other by the snap-fit method.

With the pair of divided bodies 141, 142 united, an end surface in the first direction X1 of the engaging portion 125 of the divided body 141 is, for example, engaged with an end surface in the first opposite direction X2 of the engaging portion 125 of the divided body 142. At this time, the tip part and the engaging portion 125 of the resilient piece 129 of the divided body 141 at least partly are accommodated in the recess 128 of the other divided body 142.

Further, the tip part and the engaging portion 125 of the resilient piece 129 of the divided body 142 are accommodated in the recess 128 of the other divided body 141. By these, a pair of the engaging portions 125 are engaged with each other inside the retainer 120.

As shown in FIG. 12, the divided receptacle 130A particularly projects in the second direction Y1 from an end surface in the second direction Y1 of the divided body portion 121A. The divided receptacle 130A includes, for example, one engaging portion 131, one engaging portion 132 and cut portions 133.

The engaging portion 131 particularly is provided to correspond to the engaging portion 57 (see FIG. 10) of the outer housing 50. The engaging portion 131 particularly substantially is in the form of a flat plate extending along the second direction Y1.

The engaging portion 131 particularly is in the form of a cantilever having a base end part connected to the divided body portion 121A as a fixed end and a tip part on a side opposite to the base end part in the second direction Y1 as a free end. The engaging portion 131 is configured to be deflectable in the first direction X1 by being resiliently deformed.

As shown in FIG. 4, the engaging portion 131 particularly includes an engaging hole 131X, with which the engaging portion 57 is engaged. The engaging portions 131, 57 are, for example, engaged with each other by the snap-fit method.

The engaging portion 131 particularly is provided at a position different from the engaging portion 93 of the inner member 90 in a circumferential direction of the outer housing 50. Thus, the engaging portions 131, 93 are provided not to overlap in a radial direction of the outer housing 50.

The engaging portion 132 particularly is provided to correspond to the engaging portion 58 of the outer housing 50. As shown in FIG. 12, the engaging portion 132 is, for example, provided on an end part in the third opposite direction Z2 of the divided receptacle 130A. The engaging portion 132 is, for example, provided substantially side by side with the engaging portion 124 in the second direction Y1.

The engaging portion 132 particularly is formed to project in the first opposite direction X2 from an end part in the first direction X1 of the divided receptacle 130A. A tip part of the engaging portion 132 particularly projects further in the first opposite direction X2 than the facing surface 126.

The engaging portion 132 particularly substantially is in the form of a cantilever having a base end part as a fixed end and the tip part as a free end. The engaging portion 132 is configured to be deflectable in the third direction Z1 by being resiliently deformed.

As shown in FIG. 10, the engaging portion 132 particularly includes a t least one engaging hole 132X, with which the engaging portion 58 is engaged. The engaging portion 132 particularly substantially extends along the first direction X1. The engaging portions 132, 58 are, for example, engaged with each other by the snap-fit method.

As shown in FIG. 12, the one or more cut portions 133 particularly are formed to be recessed toward the divided body portion 121A from a tip part in the second direction Y1 of the divided receptacle 130A. The cut portions 133 of this embodiment are formed to be recessed from the tip part in the second direction Y1 of the divided receptacle 130A to an end surface in the second direction Y1 of the divided body portion 121A.

As shown in FIG. 4, the cut portions 133 particularly are provided to correspond to the engaging portions 93 of the inner member 90. The cut portions 133 particularly substantially are provided at positions overlapping the engaging portions 93 in the circumferential direction of the outer housing 50.

The cut portions 133 particularly are formed to expose the engaging portions 93. The cut portions 133 of this embodiment are provided on both sides of the engaging portion 131 in the third direction Z1. Since the engaging portions 93 can be provided in the cut portions 133 by providing the cut portions 133, the connector 30 can be reduced in size as compared to a configuration not including the cut portions 133.

Next, an example of an assembling method of the connector 30 is described.

First, the sealing members 100 are individually mounted on the plurality of wires 20. Subsequently, the wires 20 having the sealing members 100 mounted thereon at least partly are inserted through the through holes 91X of the inner member 90. In this way, the sealing members 100 at least partly are individually fit inside the plurality of through holes 91X.

Subsequently, the inner member 90 at least partly is inserted into the outer housing 50 with the sealing member 110 (see FIG. 5) mounted on the outer peripheral surface of the inner member 90.

Then, the one or more engaging portions 93 of the inner member 90 particularly are engaged with the one or more engaging portions 56 of the outer housing 50, thereby mounting the inner member 90 on the end part of the outer housing 50.

At this time, as shown in FIG. 5, sealing is provided between the outer peripheral surfaces of the wires 20 and the inner peripheral surface of the inner member 90 by the sealing members 100 and/or sealing is provided between the outer peripheral surface of the inner member 90 and the inner peripheral surface of the outer housing 50 by the sealing member 110.

In this way, it can be suppressed that a fluid or a liquid such as water intrudes into the outer housing 50 from the end part of the outer housing 50. Further, since the sealing members 100 can be individually mounted on the plurality of wires 20, workability in mounting the sealing members 100 on the wires 20 can be improved as compared to the case where the plurality of wires 20 are mounted through a one-piece rubber plug.

Subsequently, as shown in FIG. 10, the retainer 120 particularly is mounted on (particularly the end part of) the outer housing 50. For example, the pair of divided bodies 141, 142 are mounted on the outer housing 50 from the first direction X1 and first opposite direction X2. That is, the pair of divided bodies 141, 142 are mounted on the outer housing 50 from directions intersecting an inserting direction (here, second direction Y1) of the wires 20 into the connector housing 40. The pair of divided bodies 141, 142 particularly are so mounted on the outer housing 50 that the engaging portions 131 are engaged with the engaging portions 57 and the engaging portions 132 are engaged with the engaging portions 58.

Further, at the same time as the pair of divided bodies 141, 142 are mounted on the outer housing 50, the pair of divided bodies 141, 142 particularly are united as shown in FIG. 13. When the pair of divided bodies 141, 142 are united, the engaging portion 123 of the divided body 141 and the engaging portion 124 of the divided body 142 are engaged, the at least one engaging portion 124 of the divided body 141 and the at least one engaging portion 123 of the divided body 142 particularly are engaged, and the engaging portions 125 of the divided bodies 141, 142 particularly are engaged. By this engagement at plural (e.g. three) positions, the pair of divided bodies 141, 142 can be firmly engaged.

Further, when the pair of divided bodies 141, 142 are mounted on the outer housing 50 as shown in FIG. 5, the end surfaces in the second direction Y1 of the divided body portions 121A of the respective divided bodies 141, 142 particularly contact the inner member 90 and the sealing members 100. In this way, it is possible to suppress the detachment of the inner member 90 and the sealing members 100 from the connector housing 40.

Next, functions of this embodiment are described.

(1) The inner member 90 including the plurality of through holes 91X, through which the plurality of wires 20 are individually passed, particularly is mounted on the end part of the connector housing 40, and the sealing members 100 are individually fit into the plurality of through holes 91X. Thus, the wires 20 and the sealing members 100 can be mounted in the inner member 90, for example, by individually mounting the sealing members 100 one by one on the wires 20 and at least partly inserting the wires 20 having the sealing members 100 mounted thereon into the through holes 91X of the inner member 90.

Accordingly, the sealing members 100 can be individually mounted one by one on the wires 20, wherefore workability in mounting the sealing members 100 on the wires 20 can be improved as compared to the case where the plurality of wires 20 are mounted through a one-piece rubber plug. In this way, the assembling workability of the connector 30 can be improved.

In a conventional connector, if sealing members are merely mounted one by one on wires, sealing cannot be provided between a connector housing and wires since a clearance is formed between adjacent ones of the sealing members in an arrangement direction of the plurality of wires. In contrast, the connector 30 of this embodiment is provided with the inner member 90 including the plurality of through holes 91X, the plurality of sealing members 100 to be individually fit into the plurality of through holes 91X and the sealing member 110 to be fit outside the inner member 90. Here, each sealing member 100 particularly is held in close contact with the inner peripheral surface of the through hole 91X and the outer peripheral surface of the wire 20. Further, the sealing member 110 particularly is held in close contact with the outer peripheral surface of the inner member 90 and the inner peripheral surface of the connector housing 40. By these inner member 90 and sealing members 100, 110, sealing is provided between the outer peripheral surfaces of the wires 20 and the inner peripheral surface of the inner member 90 and sealing is provided between the outer peripheral surface of the inner member 90 and the inner peripheral surface of the connector housing 40.

In this way, it can be suppressed that a fluid or a liquid such as water intrudes into the connector housing 40 from an end part of the connector housing 40. By providing the inner member 90 particularly including the plurality of through holes 91X in this way, the assembling workability of the connector 30 can be improved and the waterproofness of the connector 30 can be maintained.

(2) The retainer 120 particularly is provided to retain the inner member 90 and the sealing members 100 in the connector housing 40. Thus, it is possible to suppress the detachment of the inner member 90 and the sealing members 100 from the connector housing 40. In this way, waterproofness in the connector 30 can be suitably maintained.

(3) The engaging portions 93 of the inner member 90 and the engaging portions 131 of the retainer 120 particularly are provided at the positions mutually different in the circumferential direction of the connector housing 40. Thus, the engaging portions 93, 131 particularly are provided at positions not overlapping in a radial direction of the connector housing 40. Therefore, the connector 30 can be reduced in size in the radial direction of the connector housing 40 as compared to the case where the engaging portions 93, 131 overlap in the radial direction of the connector housing 40.

(4) The retainer 120 particularly is composed of or comprises the pair of divided bodies 141, 142. Thus, the retainer 120 can be mounted on the end part of the connector housing 40, for example, after the wires 20 at least partly are inserted into the connector housing 40. In this way, workability in mounting the retainer 120 on the connector housing 40 can be improved and the assembling workability of the connector 30 can be improved.

(5) The pair of divided bodies 141, 142 particularly are engaged at plural (e.g. three) positions of the engaging portions 123, 124 and 125. Thus, the pair of divided bodies 141, 142 can be firmly engaged with each other. Since the separation of the divided bodies 141, 142 can be suitably suppressed in this way, the detachment of the retainer 120 from the connector housing 40 can be suitably suppressed.

Further, since the engaging portions 125 particularly are provided inside the retainer 120, it can be suppressed that a worker erroneously disengages the engaging portions 125. In this way, the separation of the pair of divided bodies 141, 142 can be suitably suppressed and the detachment of the retainer 120 from the connector housing 40 can be suitably suppressed.

(6) The engaging portion 125 particularly is provided on or near the tip part of the resilient piece 129 projecting toward the other divided body 142 from the bottom surface of the recess 128 provided in the facing surface 126. Thus, a wider space in which the resilient piece 129 can be deflected can be formed and the enlargement of the retainer 120 can be suppressed, for example, as compared to a configuration not including the recess 128, i.e. a configuration in which the resilient piece 129 is provided on the facing surface 126.

(7) The projecting portions 127 projecting radially inwardly of the wire through hole 122, i.e. toward the wire 20 passed through the wire through hole 122, from the inner peripheral surface of each wire through hole 122 particularly is provided on the inner peripheral surface of the (particularly each) wire through hole 122. Since the wire 20 passed through the wire through hole 122 can be suitably supported by these projecting portions 127, it can be suitably suppressed that the wire 20 swings inside the wire through hole 122. In this way, for example, a relative movement of the terminal 31 connected to the end part of the wire 20 with respect to the terminal 201 as a mating terminal can be suitably suppressed. As a result, the wear of a contact point between the terminals 31 and 201 can be suitably suppressed.

(8) One (first wire through hole) of the two wire through holes 122 particularly is provided between the engaging portions 123 and 125 of the one divided body 141 in the third direction Z1.

Further, the other (second wire through hole) of the two wire through holes 122 particularly is provided between the engaging portions 124 and 125 of the one divided body 141 in the third direction Z1. That is, each of the two wire through holes 122 is provided to be sandwiched by engaging parts at two positions in the pair of divided bodies 141, 142.

Thus, the pair of divided bodies 141, 142 can be firmly engaged in each wire through hole 122, for example, as compared to the case where an engaging part is provided only at one position near each wire through hole 122.

Since the pair of divided bodies 141, 142 particularly can be suitably brought close to each other in each wire through hole 122 in this way, the wire 20 can be stably supported by the projecting portions 127 provided on the inner peripheral surface of each wire through hole 122. Therefore, it can be suitably suppressed that the wire 20 swings inside each wire through hole 122.

(9) Since the pair of divided bodies 141, 142 particularly are formed to have the same shape, the number of components, in particular, an increase in the number of components, can be suppressed.

Further, since a common mold particularly can be used to manufacture the divided bodies 141, 142, the number of molds can be reduced and the manufacturability of the retainer 120 can be improved. Consequently, the manufacturability of the connector 30 can be improved.

(10) The inner housing 41 at least partly accommodating the terminals 31 particularly is supported by the inner member 90 inside the outer housing 50. Thus, it can be suppressed that the inner housing 41 swings inside the outer housing 50 if vibration is applied to the connector 30. In this way, relative movements of the terminals 31 at least partly accommodated in the inner housing 41 with respect to the terminals 201 as the mating terminals can be suppressed and the wear of contact points between the terminals 31 and 201 can be suitably suppressed.

(11) The plurality of terminal accommodating portions 43 particularly are integrally or unitarily formed through the base portion 42. Thus, the number of components can be reduced as compared to the case where the plurality of terminal accommodating portions 43 are configured as separate components.

Further, the inner member 90 particularly can support the plurality of terminal accommodating portions 43 by contacting the base portion 42. Thus, the structure of the inner member 90 can be simplified as compared to the case where structures for supporting the plurality of terminal accommodating portions 43 are individually provided.

Accordingly, to improve assembling workability, there particularly is provided a connector 30 which includes one or more, particularly a plurality of terminals 31 to be respectively connected to one or more (particularly end parts of) wires 20, an annular connector housing 40 for at least partly accommodating the one or more terminals 31, and an inner member 90 to be mounted on an end part of the connector housing 40. The connector 30 includes one or more, particularly a plurality of through holes 91X provided in the inner member 90, the one or more wires 20 being individually passed through the one or more through holes 91X, one or more annular sealing members 100 to be individually fit inside the one or more through holes 91X, and an annular sealing member 110 to be fit outside the inner member 90. The sealing members 100 are held in close contact with outer peripheral surface(s) of the one or more wires 20 and one or more inner peripheral surfaces of the one or more through holes 91X. The sealing member 110 is held or holdable in close contact with an outer peripheral surface of the inner member 90 and an inner peripheral surface of the connector housing 40.

Other Embodiments

The above embodiment can be modified and carried out as follows. The above embodiment and the following modifications can be carried out in combination without technically contradicting each other.

- The structure of the divided body 141, 142 in the above embodiment may be changed as appropriate.
- The projecting portions 127 in the divided body 141, 142 of the above embodiment may be omitted.
- The recess 128 in the divided body 141, 142 of the above embodiment may be omitted. In this case, the resilient piece 129 may be, for example, provided on the facing surface 126.
- Although the engaging portion 125 particularly is provided between the two wire through holes 122 in the third direction Z1 in the above embodiment, there is no limitation to this. For example, the engaging portion(s) 125 may be provided on one end part or both end parts in the width direction of the divided body 121A.
- The structure of the engaging portion 125 in the divided body 141, 142 of the above embodiment may be changed as appropriate. The structure of the engaging portion 125 is not particularly limited as long as the engaging portion 125 is so structured that the engaging portions 125 of the pair of divided bodies 141, 142 are engageable with each other.
- The structures of the engaging portions 123, 124 in the divided body 141, 142 of the above embodiment may be changed as appropriate. The structures of the engaging portions 123, 124 are not particularly limited as long as the engaging portions 123, 124 are structured to be engageable with each other.
- Although the divided body 141, 142 of the above embodiment particularly includes two engaging portions 123, 124 provided on the outer periphery of the retainer 120 and one engaging portion 125 provided inside the retainer 120, the numbers of these engaging portions 123, 124 and 125 are not limited. For example, one or a plurality of the engaging portions 125 may be provided inside the retainer 120.
- The engaging portion 125 in the divided body 141, 142 of the above embodiment may be omitted. The divided body 141, 142 in this case preferably includes the engaging portions 123, 124.
- The engaging portions 123, 124 in the divided body 141, 142 of the above embodiment may be omitted. The divided body 141, 142 in this case preferably includes the engaging portion 125.
- The cut portions 133 in the divided body 141, 142 of the above embodiment may be omitted.
- The engaging portion 131 in the divided body 141, 142 of the above embodiment may be provided to at least partly overlap the engaging portion 93 of the inner member 90 in the radial direction of the outer housing 50.
- The structures of the engaging portions 131, 132 in the divided body 141, 142 of the above embodiment may be changed as appropriate. The structures of the engaging portions 131, 132 are not particularly limited as long as the engaging portions 131, 132 are structured to be respectively engageable with the engaging portions 57, 58 of the outer housing 50.
- At least one of the engaging portions 131, 132 in the divided body 141, 142 of the above embodiment may be omitted.
- Although the pair of divided bodies 141, 142 particularly are formed to have the same shape in the above embodiment, there is no limitation to this. For example, the pair of divided bodies 141, 142 are formed to have different shapes.
- Although the retainer 120 particularly is composed of the pair of divided bodies 141, 142 in the above embodiment, there is no limitation to this. For example, the retainer 120 may be composed of three or more divided bodies. For example, the retainer 120 may be composed of a single component.
- The retainer 120 in the above embodiment may be omitted.
- The structure of the inner member 90 in the above embodiment may be changed as appropriate.
- The projecting portion 92 in the inner member 90 of the above embodiment may be omitted.
- The number of the engaging portions 93 in the inner member 90 of the above embodiment is not particularly limited.
- The structure of the engaging portion 93 in the inner member 90 of the above embodiment may be changed as appropriate. The structure of the engaging portion 93 is not particularly limited as long as the engaging portion 93 is structured to be engageable with the engaging portion 56 of the outer housing 50.
- Although the sealing members 100, 110 are embodied as rubber rings made of rubber in the above embodiment, there is no limitation to this. For example, ring members made of an elastic or resilient material other than rubber may be adopted as the sealing members 100, 110.
- Although the plurality of terminal accommodating portions 43 are integrally or unitarily formed through the base portion 42 in the inner housing 41 of the above embodiment, there is no limitation to this. For example, the plurality of terminal accommodating portions 43 may be configured as separate components.
- Although the inner housing 41 and the outer housing 50 particularly are configured as separate components in the connector housing 40 of the above embodiment, there is no limitation to this. For example, the inner housing 41 and the outer housing 50 may be integrally or unitarily formed.
- Although the wires 20 particularly are embodied as shielded wires in the above embodiment, there is no limitation to this. For example, the wires 20 may be embodied as non-shielded wires not having an electromagnetic shield structure themselves. Particularly in this case, the intervening members 60, the fixing members 61 and the inner shell 80 may be omitted.

Although the connector 30 of the above embodiment particularly includes two terminals 31, the connector 30 may include one, three or more terminals 31.

Although the connector 200 of the above embodiment particularly includes two terminals 201, the connector 200 may include one, three or more terminals 201.

The embodiment disclosed this time should be considered illustrative in all aspects, rather than restrictive. The scope of the present invention is intended to be represented not by the above meaning, but by the scope of claims and include all changes in the scope of claims and in the meaning and scope of equivalents.

What is claimed is:

1. A connector, comprising:
one or more terminals to be respectively connected to one or more wires;
an annular connector housing for at least partly accommodating the terminal(s);
an inner member to be mounted on an end part of the connector housing;
one or more through holes provided in the inner member, the wire(s) being individually passed through the through hole(s);
one or more first annular sealing members to be individually fit inside the through hole(s); and
an annular second sealing member having a hole inside which the inner member is to be fit,
wherein:
the one or more first sealing members are held in close contact with outer peripheral surfaces of the one or more wires and one or more inner peripheral surfaces of the through hole(s), and
the second sealing member is held in close contact with an outer peripheral surface of the inner member and an inner peripheral surface of the connector housing.

2. The connector according to claim 1, further comprising a retainer to be mounted on an end part of the connector housing, the retainer retaining the inner member and the first sealing members in the connector housing.

3. The connector according to claim 2, wherein:
the inner member includes at least one first engaging portion to be engaged with the connector housing,
the retainer includes at least one second engaging portion to be engaged with the connector housing, and
the first engaging portion is provided at a position different from the second engaging portion in a circumferential direction of the connector housing.

4. The connector according to claim 2, wherein:
the retainer is composed of a pair of divided bodies,
each of the pair of divided bodies includes at least one third engaging portion, at least one fourth engaging portion and at least one fifth engaging portion provided inside the retainer,
the third engaging portion of one of the pair of divided bodies is engaged with the fourth engaging portion of the other of the pair of divided bodies, and
the fifth engaging portion of the one divided body is engaged with the fifth engaging portion of the other divided body.

5. The connector according to claim 4, wherein:
each of the pair of divided bodies includes a facing surface facing the other divided body, a recess recessed from the facing surface and a resiliently deformable resilient piece projecting toward the other divided body from a bottom surface of the recess, and
the fifth engaging portion is provided on a tip part of the resilient piece.

6. The connector according to claim 4, wherein:
the retainer includes one or more wire through holes, the wire(s) being individually passed through the wire through hole(s), and
each wire through hole(s) includes a projecting portion projecting radially inwardly of the wire through hole from an inner peripheral surface of the wire through hole.

7. The connector according to claim 6, wherein:
the plurality of wire through holes include a first wire through hole and a second wire through hole,
the fifth engaging portions are provided between the first and second wire through holes in an arrangement direction of the first and second wire through holes,
the first wire through hole is provided between the third and fifth engaging portions in one divided body in the arrangement direction of the first and second wire through holes, and
the second wire through hole is provided between the fourth and fifth engaging portions in the one divided body in the arrangement direction of the first and second wire through holes.

8. The connector according to claim 4, wherein the pair of divided bodies have the same shape.

9. The connector according to claim 4, wherein:
the connector housing includes:
an inner housing for at least partly accommodating the terminal(s); and
an outer housing for at least partly accommodating the inner housing,
the inner housing is a component separate from the outer housing, and
the inner member is mounted on an end part of the outer housing and supports the inner housing inside the outer housing.

10. The connector according to claim 9, wherein:
the inner housing includes a base portion and one or more terminal accommodating portions extending from the base portion,
the terminal accommodating portion(s) individually at least partly accommodate the terminal(s),
the terminal accommodating portion(s) are integrally or unitarily formed through the base portion, and
the inner member supports the inner housing by contacting the base portion.

11. A wiring harness, comprising:
the connector according to claim 10; and
one or more wires to be respectively connected to the one or more terminals.

12. An assembling method for assembling a connector of the wiring harness, in particular according to claim 11, comprising the following steps:
individually fitting one or more first annular sealing members to one or more wires of the wire harness;
respectively connecting one or more terminals to the one or more wires;
at least partly accommodating the terminal(s) in an annular connector housing;
individually passing the one or more wires through one or more through holes provided in an inner member to be mounted on an end part of the connector housing, so that the one or more first annular sealing members are individually fit inside the through hole(s); and
fitting an annular second sealing member outside the inner member, so that:
the one or more first sealing members are held in close contact with outer peripheral surfaces of the one or more wires and one or more inner peripheral surfaces of the through hole(s), and
the second sealing member is held in close contact with an outer peripheral surface of the inner member and an inner peripheral surface of the connector housing.

13. The connector according to claim 1, wherein the second sealing member is disposed between the inner member and the connector housing in a plan view.

\* \* \* \* \*